United States Patent
Beale

(10) Patent No.: US 9,359,175 B2
(45) Date of Patent: Jun. 7, 2016

(54) SOFT-SIDED CONTAINERS AND SYSTEMS AND METHODS FOR USING SOFT-SIDED CONTAINERS

(75) Inventor: Aldon E. Beale, Brunswick, GA (US)

(73) Assignee: Aldon E. Beale, Madisonville, TN (US)

(*) Notice: Subject to any disclaimer, the term of this patent is extended or adjusted under 35 U.S.C. 154(b) by 1456 days.

(21) Appl. No.: 12/466,542

(22) Filed: May 15, 2009

(65) Prior Publication Data

US 2010/0290887 A1 Nov. 18, 2010

(51) Int. Cl.
- B65G 69/00 (2006.01)
- B66C 1/22 (2006.01)
- A01F 25/14 (2006.01)
- B65D 88/16 (2006.01)
- E02F 3/407 (2006.01)

(52) U.S. Cl.
CPC ............. *B66C 1/226* (2013.01); *A01F 25/14* (2013.01); *B65D 88/1681* (2013.01); *E02F 3/407* (2013.01)

(58) Field of Classification Search
CPC combination set(s) only.
See application file for complete search history.

(56) References Cited

U.S. PATENT DOCUMENTS

| | | | |
|---|---|---|---|
| 1,112,016 A | 9/1914 | MacLachlan | |
| 2,382,346 A | 11/1943 | Streater | |
| 3,011,278 A | 12/1961 | Lust | |
| 3,208,109 A | 9/1965 | Buck, Jr. | |
| 3,335,769 A | 8/1967 | Ilg | |
| 3,598,266 A | 8/1971 | Fisher | |
| 3,945,519 A * | 3/1976 | Eriksson | 414/812 |
| 4,055,255 A | 10/1977 | Vasquez | |
| 4,068,771 A | 1/1978 | Zimmerman | |
| 4,141,725 A | 2/1979 | Murai et al. | |
| 4,184,522 A | 1/1980 | Waite | |
| 4,300,600 A | 11/1981 | Tetenborg et al. | |
| 4,633,602 A | 1/1987 | Layh et al. | |
| 4,782,606 A | 11/1988 | Surface | |
| 4,864,748 A | 9/1989 | Boyer | |
| 5,004,022 A | 4/1991 | Carlsson | |
| 5,353,851 A | 10/1994 | Cline | |
| 5,417,261 A | 5/1995 | Kanzler et al. | |
| 5,437,318 A | 8/1995 | Kanzler et al. | |
| 5,564,886 A | 10/1996 | Emerson et al. | |
| 5,687,781 A | 11/1997 | Grizz | |
| 5,692,875 A | 12/1997 | Boman | |
| 5,724,793 A | 3/1998 | Inman | |

(Continued)

FOREIGN PATENT DOCUMENTS

GB 1 380 398 1/1975

OTHER PUBLICATIONS

International Search Report—PCT/US2010/001401 dated Jul. 14, 2010 (2 pages).

(Continued)

Primary Examiner — Saul Rodriguez
Assistant Examiner — Willie Berry, Jr.
(74) Attorney, Agent, or Firm — Martine Penilla Group, LLP

(57) ABSTRACT

A system and method of packaging a bulk material is provided for scooping a quantity of the bulk material into a standard equipment bucket of an excavating or front loader equipment, covering the bucket with a single soft-sided container such that a bottom of the single soft-sided container spans and covers a mouth of the bucket, securing the single soft-sided container over the bucket to close the mouth of the bucket, and inverting the bucket such that the mouth of the bucket is oriented substantially downward to transfer the quantity of the bulk material from the bucket directly into the single soft-sided container.

23 Claims, 21 Drawing Sheets

(56) References Cited

U.S. PATENT DOCUMENTS

| | | | |
|---|---|---|---|
| 5,829,809 A | 11/1998 | Arney et al. |
| 5,829,949 A | 11/1998 | Brown |
| 5,833,429 A | 11/1998 | McNeilus et al. |
| 5,834,046 A | 11/1998 | Turpin et al. |
| 5,842,957 A | 12/1998 | Wheeler |
| 5,873,396 A | 2/1999 | Biebrach et al. |
| 5,885,053 A | 3/1999 | Deye |
| 5,894,871 A | 4/1999 | Greer |
| 5,919,027 A | 7/1999 | Christenson |
| 5,934,858 A | 8/1999 | Christenson |
| 5,938,398 A | 8/1999 | Brown |
| 5,947,347 A | 9/1999 | Cline, Sr. |
| 5,951,870 A | 9/1999 | Utterberg |
| 5,993,672 A | 11/1999 | Manz |
| 6,079,934 A | 6/2000 | Beale |
| 6,142,727 A | 11/2000 | Beale |
| 6,150,163 A | 11/2000 | McPherson et al. |
| 6,155,772 A | 12/2000 | Beale |
| 6,178,807 B1 | 1/2001 | Baldwin et al. |
| 6,187,198 B1 | 2/2001 | Utterberg |
| 6,213,706 B1 | 4/2001 | Christenson |
| 6,264,202 B1 | 7/2001 | Briggs |
| 6,305,322 B1 | 10/2001 | Patel |
| 6,307,013 B1 | 10/2001 | Chivers |
| 6,344,139 B1 | 2/2002 | Utterberg |
| 6,350,098 B1 | 2/2002 | Christenson et al. |
| 6,350,589 B1 | 2/2002 | Morris et al. |
| 6,386,026 B1 | 5/2002 | Zamfes |
| 6,403,144 B1 | 6/2002 | El-Khoury et al. |
| 6,415,649 B1 | 7/2002 | Spinler et al. |
| 6,433,144 B1 | 8/2002 | Morris et al. |
| 6,436,458 B2 | 8/2002 | Kuechle et al. |
| 6,464,878 B2 | 10/2002 | Utterberg |
| 6,522,777 B1 | 2/2003 | Paulsen et al. |
| 6,544,574 B2 | 4/2003 | El-Khoury et al. |
| 6,544,942 B1 | 4/2003 | Smith et al. |
| 6,562,114 B1 | 5/2003 | Yeiser et al. |
| 6,603,103 B1 | 8/2003 | Ulrich et al. |
| 6,740,350 B2 | 5/2004 | Pfeiffer |
| 6,803,067 B2 | 10/2004 | Braginsky et al. |
| 6,814,095 B2 | 11/2004 | King |
| 6,919,098 B2 | 7/2005 | Ratka et al. |
| 6,927,282 B2 | 8/2005 | Chivers et al. |
| 6,948,510 B2 | 9/2005 | King |
| 6,956,963 B2 | 10/2005 | Ulrich et al. |
| 6,969,226 B2 | 11/2005 | Raley |
| 6,994,225 B2 | 2/2006 | Hakim |
| 7,004,713 B2 | 2/2006 | Sweningson |
| 7,037,902 B2 | 5/2006 | Olsson et al. |
| 7,053,037 B2 | 5/2006 | Smith et al. |
| 7,169,739 B2 | 1/2007 | Falana et al. |
| 7,172,688 B2 | 2/2007 | Petersen |
| 7,173,121 B2 | 2/2007 | Fang |
| 7,179,904 B2 | 2/2007 | Kwok |
| 7,181,964 B2 | 2/2007 | Nivens, Jr. et al. |
| 7,189,337 B2 | 3/2007 | Sortwell |
| 7,208,268 B2 | 4/2007 | Stroobant |
| 2007/0140598 A1 | 6/2007 | McGillick, Sr. et al. |

OTHER PUBLICATIONS

C-MAC Industries(Aust.) Pty.Ltd.—C-MAC Bagging Equipment—Retrieved from the Internet: http://www.cmac.com.au/bagging.html; (pp. 1-10).

CRC-Evans—"The Saddle Bag Weight"—Retrieved from the Internet; http://www.crc-evans.com/WS/sbw-body.htm (pp. 1-4).

Ceattachmentsinc. "New and Unique Attachment"—Retrieved from the Internet: http://www.ceattach.com/cea/ceaweb.store (3 pages).

* cited by examiner

SOFT-SIDED CONTAINERS AND SYSTEMS AND METHODS FOR USING SOFT-SIDED CONTAINERS

The present invention relates generally to bulk material handling, and more particularly, to methods and systems for transferring, packaging, transporting, and otherwise handling bulk materials.

Typical processes for loading a typical soft-sided container with bulk material require supporting the soft-sided container using some sort of a support structure. FIG. 1 is a simplified schematic of a typical soft-sided container 100 supported in an external support structure. These structures are used in many forms and are of many different types, FIG. 1 showing an exemplary support structure 102 as a frame in which the container 100 is received. Such support structures are configured as structures in addition to the soft-sided container 100, and are in addition to equipment used for loading bulk materials 110 (shown in circle 112 and by arrow 114 as being loaded into the soft-sided container 100). The soft-sided container 100 is referred to as a "supported soft-sided container" when used with the support structure 102.

Exemplary bulk materials may include sand, minerals (e.g., salt and stone), agricultural materials (e.g., chemicals, fertilizers; bulk plastic pellets, whether new or recycled); waste materials (e.g., hazardous or non-hazardous), nuclear waste products loaded at controlled sites, landscaping or garden materials (e.g., compost, soil, bark) generally sold in small bags of manageable size, bulk grains (e.g., corn, feedstocks) and seeds. Such exemplary bulk materials may be mixed with other exemplary bulk materials, and each may be "wet", as by being mixed with a liquid, such as water. One common feature of all such bulk materials is that for transport, the bulk material has no inherent shape and assumes the shape of the container in which the bulk material is received for transport, and this applies whether or not the bulk material is mixed with a liquid.

The supported soft-sided container 100 can be filled by scooping and dumping multiple front end loader bucket loads, or loads from a bucket of similar loading equipment until the supported soft-sided container is filled. Then, the supported soft-sided container is closed to prevent spillage. Finally, the filled soft-sided container can be moved, generally without the support structure 102.

By way of example, bulk materials are handled by equipment such as standard front end loaders (also known as "front loaders") or standard backhoes (known as excavators). Such a front loader may be a wheeled vehicle that uses a standard bucket for scooping, defining and holding a load (also known as a "unit") of bulk material. Such a standard excavator may be a wheeled or tracked vehicle that uses a standard backhoe bucket for scooping (e.g., digging into), and defining, and holding a load (a unit) of bulk material. The front loader is typically used to move (or carry or transport), and then load (e.g., dump) the bulk materials (e.g., into a dump truck). After the excavator scooping, defining, and holding operations, the excavator is typically used only to load the bulk materials (e.g., into a dump truck).

As described above the typical supported soft-sided container 100 is generally configured large enough to receive multiple bucketfuls of bulk material 110. Then a fork lift or crane or other equipment must be used to lift and transport the filled soft-sided container from the support structure 102 to a destination. In this example, the support structure is again used only after a next soft-sided container 100 is inserted into the structure 102. Also, after the insertion, once the standard bucket of the standard front loader or backhoe has been filled, there may be an operation of freely pouring the bulk material from the bucket into the next open (supported) soft-sided container and such pouring may result in introducing into the atmosphere airborne contaminants and spilling of the bulk material.

Often the original equipment that is used to fill the typical supported soft-sided container is unable to move such filled soft-sided container because such filled container may exceed the load limits for such original equipment. Such load limits may, e.g., be expressed as a maximum weight-carrying capacity of the standard bucket of such equipment. As a result a second piece of equipment (such as a forklift or crane) is required to move such filled soft-sided container. For example, a crane could be used to lift such a soft-sided container that has received and been filled by many bucket loads of bulk material, and the greater weight-carrying capacity of the crane enables, e.g., placing such filled container on a flatbed truck. Once loaded on the truck, such filled soft-sided container can then be transported to a destination.

Thus, this approach to loading bulk material into such soft-sided container required multiple pieces of equipment, including one support structure to support an empty soft-sided container, another piece of equipment to fill such supported soft-sided container with the multiple loads, and yet another piece of equipment to move such filled soft-sided container. In view of the foregoing, there is a need for a simpler, more efficient method and system for packaging and handling bulk materials.

SUMMARY

Broadly speaking, the present invention fills these needs by providing a simpler, more efficient method and system for packaging and handling bulk materials. It should be appreciated that the present invention can be implemented in numerous ways, including as a process, an apparatus, a system or a device. Several inventive embodiments of the present invention are described below.

One embodiment provides a method of transferring bulk material for transport. The method includes telescoping a hollow empty soft-sided bag and a standard open-top bucket attached to a bulk material handling equipment, the bucket being configured with a mouth extending around the open-top and with walls extending from the mouth to a base of the bucket, the telescoping orienting the bucket with the mouth facing up to contain the bulk material, the telescoping further orienting a bottom of the bag across the open-top of the bucket with sides of the bag hanging from the mouth; securing the telescoped empty bag to the standard bucket that contains the bulk material so that the bottom of the bag is held against the mouth to close the open-top of the standard bucket; and inverting the telescoped and secured empty bag and the standard bucket, the inverting orienting the bucket with the mouth facing down and the bottom of the bag under the mouth for transferring the bulk material onto the bottom of the bag for support against the force of gravity so that the walls of the bucket laterally retain the bulk material that is supported on the bottom of the bag.

The telescoping operation can position the sides of the bag hanging outside of the walls of the bucket and can position the base of the bucket below the bottom of the bag. The inverting operation can position the bucket inside the bag and the sides of the bag extending upwardly toward and enclosing the mouth of the bucket.

The telescoping operation can hang the sides of the container from the mouth of the bucket and extending toward the base of the bucket and extending at least partially along the walls of the bucket to at least partially enclose the walls of the bucket and the securing can further maintain the sides of the bag close to the walls of the bucket. After inverting, there may be setting the bottom of the inverted and secured and telescoped bag on a support surface; loosening the secured bag relative to the bucket; and slowly moving the inverted telescoped bucket away from the support surface so that the walls of the inverted bucket sequentially release all of the bulk material from the bucket into the bag.

The telescoping operation can be performed with the bag configured with a first section corresponding to the bucket to receive the bucket and the bag configured with a second section to extend down past the walls of the bucket.

The method can also include setting the bottom of the inverted and secured and telescoped bag on a support surface, loosening the secured bag from the bucket slowly raising the bucket with the bottom of the bag on the support surface so that the first section of the bag receives the bulk material from the inverted bucket, and the bucket moves out of the first and second sections of the bag; and tightly closing the second section of the bag to retain the bulk material in first section of the bag. The method can also include securing the closed bag to the bucket; and transporting the closed bag and the bulk material that is in the closed bag, the transporting being by operating the same piece of bulk material handling equipment to which the bucket is attached.

The method can also include the following further operations performed after the inverting operation; placing the secured bag on a support surface; loosening the secured bag relative to the bucket; slowly raising the bucket relative to the bag so that the sides of the bag receive the bulk material urged by the force of gravity from the inverted and raised bucket, the slowly raising sequentially transferring all of the bulk material into the bag, continuing the raising to move the bucket to a position out of the bag; and tightly closing the sides of the bag around the bulk material that is in the bag to retain the bulk material in the bag. The method can further include transporting the closed bag and the bulk material that is in the closed bag, the transporting being by operating the bulk material handling equipment.

The method can further include transporting the secured bag and bucket and the bulk material to a location by operating the same piece of bulk material handling equipment.

The method can further include setting the bottom of the bag on a support surface at the location; loosening the secured bag relative to the bucket; moving the bucket to a position out of the bag to transfer all of the bulk material into the bag; and tightly closing the sides of the bag around the bulk material that is in the bag to retain the bulk material in the bag.

Another embodiment provides a method of packaging bulk material. The method includes covering a standard open-top bucket that is attached to a piece of bulk material handling equipment, the bucket being configured with a mouth at the open-top to receive and discharge bulk material to be packaged, the covering being by a bottom of a single soft-sided container and by sides of the container, the bottom being configured to span the mouth and the sides being configured to define an opening; securing the single soft-sided container over the standard bucket with the bottom of the bag held against the mouth to close the open-top of the standard bucket; and simultaneously inverting the bucket and the bulk material therein and the secured container, the inverting orienting the bucket substantially downward and transferring the bulk material from the bucket onto the secured single soft-sided container while the single soft-sided container continues to cover the bucket.

The method can further include placing the bottom of the inverted secured single soft-sided container on a supporting surface at a location at which the container is to be used by the same piece of equipment, reversing the securing operation to release the bottom of the inverted container against the mouth; and removing the inverted bucket from the inverted soft-sided container, the removing being slow movement to and through the open end of the soft-sided container to release all of the bulk material from the bucket into the single soft-sided container.

The method can further include the covering operation comprising an operation of configuring the container from woven polypropylene having a characteristic of porosity with respect to liquids and containment of particles; and wherein the bulk material is particles of sand mixed with liquid water; and the method may further include closing the open end of the single soft-sided container to package the bulk material at the location at which the container was placed; and using the same piece of equipment to repeat the next-above covering, securing, inverting, and closing operations with respect to a series of next containers and sand mixed with water, wherein some of the containers of the series of next containers are placed on top of a prior-placed container, and the placing of the some on the respective tops urges the liquid water through the woven polypropylene of the closed prior-placed container while the polypropylene retains the sand in the prior-placed closed container. The method can also include transporting the inverted bucket and the bulk material therein and the inverted secured container; as well as placing the bottom of the inverted secured single soft-sided container on a supporting surface at a location at which the container is to be used, the placing being by using the same piece of equipment; reversing the securing operation to release the holding of the bottom of the inverted container against the mouth; and removing the inverted bucket from the inverted soft-sided container, the removing being slow movement to and through the open end of the soft-sided container to release all of the bulk material from the bucket into the single soft-sided container to package the bulk material at the location.

The method can further include after the securing operation and before the simultaneously inverting operation, transporting the secured bucket and the bulk material therein and the secured container to a location for packaging the bulk material in the soft-sided container; and then performing the simultaneously inverting operation.

Reversing the securing operation includes loosening straps that are secured to the container bottom and to the soft-sides and that extend around the bucket, to open the opening of the soft-sided container and permit the removing of the inverted bucket. The method can further include closing the opening of the single soft-sided container to package the bulk material at the location at which the container was placed; extending the straps completely around the bucket; securing the straps to each other, and raising the bucket to hang the inverted closed container from the bucket away from the supporting surface; and using the same piece of equipment, transporting the raised bucket and the hanging inverted closed container and the bulk material in the hanging inverted container.

Both of the securing operations can include configuring the straps as a plurality of straps, each of the straps being configured with ends extending away from the container and with the ends configured to be secured to each other, the strap configuring further providing the secured straps with a bulk material-carrying capacity that is no less than a maximum weight carrying capacity of the standard open-top bucket that is attached to the piece of bulk material handling equipment.

A volume of the bulk material in the closed single soft-sided container can be substantially equal to a volume of the bucket filled with the bulk material.

Yet another embodiment provides a soft-sided bag configured to be loaded from a piece of standard bulk material bucket of an excavating or front loader equipment, the loading being with bulk material without requiring use of a support structure that maintains the bag in an open top and upright configuration during receipt of the bulk material into the bag, the bulk material bucket being characterized by a hollow rigid body into which and from which the bulk material is transferred via a mouth defined by a continuous perimeter of the rigid body, the bag comprising a soft-sided bottom configured with a bottom perimeter corresponding to the continuous perimeter of the rigid body with which the bag is to be used, soft sides extending from all around the bottom perimeter and away from the bottom perimeter along an extent corresponding to the hollow rigid body of the bucket of the piece of equipment with which the bag is to be used, the soft sides being configured to terminate at an opening of the bag, the correspondence of the configurations of the soft-sided bottom and soft sides with the respective continuous perimeter and with the hollow rigid body being to allow the soft-sided bag to assume a telescoped relationship over the hollow rigid body with the soft sides parallel to a portion of the rigid body and with the soft-sided bottom extending completely across and over the mouth; and an arrangement of straps, the arrangement being configured to extend at least partially along and secured to the soft sides and being of length sufficient to extend completely around the rigid body, the arrangement being further configured to urge the soft-sided bottom against the perimeter of the mouth to close the mouth and to retain substantially all of the bulk material in the rigid body upon orientation of the bag and the bucket in a bulk material transfer orientation in which the soft-sided bottom is under the mouth and the opening of the bag is above the bottom of the bag and substantially all of the bulk material is within both the rigid body of the bucket that is within the soft-sided bag.

The arrangement of straps can be configured to be releasable to allow the oriented bag to move in the telescoped relationship relative to the oriented bucket and to allow the soft-sided bottom and the mouth to move away from each other so that the soft-sides directly receive the bulk material from the rigid body to effect transfer of the bulk material through the mouth directly into the soft-sided bag while the mouth is enclosed by the soft sides.

The strap arrangement can be a first strap arrangement and the bag can also include a second strap arrangement configured to close the opening of the bag and retain the bulk material within the soft sides and on the soft-sided bottom. The first strap arrangement is further configured with first and second straps, each strap extending in a path across and secured to the soft-sided bottom and configured with a separate strap end portion extending from each of two ends of the path and then at least partially along the soft sides, each separate strap end portion of one strap being of length sufficient to extend completely around the rigid body, each strap end portion of one strap being configured to releasably join the strap end portion of the other strap.

The first strap arrangement and the soft-sided bottom and the soft sides can collectively be further configured to enclose and carry a unit of bulk material of a weight which the standard bucket of the equipment with which the bag is to be used is configured to receive and be filled by, carry, and transfer into the bag. The first strap arrangement and the soft-sided bottom and the soft sides can be collectively further configured to enclose and carry a unit of bulk material of a volume which the bucket of the equipment with which the bag is to be used is configured to receive and be filled by, carry, and transfer into the bag.

The equipment with which the bag is to be used is configured to invert the bucket from a bulk material carrying orientation with the mouth above the rigid body to the bulk material transfer orientation with the mouth below the rigid body, that equipment is further configured to have a maximum weight-carrying capacity defined by a maximum weight value of the bulk material that the standard bucket is permitted to receive, the strap arrangement is a first strap arrangement, the configuration of the first strap arrangement comprising separate straps extending across and secured to the soft-sided bottom to define a pattern, each strap being configured with a strap end portion extending from opposite ends of the pattern, each strap end portion extending from the pattern at least partially along a respective one of the soft sides, the strap end portions of the same strap being of a combined length sufficient to extend around the rigid body of the bucket and being configured to join each other in a secured relationship and being of tensile strength sufficient to urge the soft-sided bottom against the perimeter of the mouth and close the mouth, the configuration of the straps and the pattern and the bottom and the soft sides rendering the bag capable of supporting the bulk material having the maximum weight value when the bucket is oriented in the bulk material transfer orientation with the soft-sided bottom under and spaced by a first distance from the mouth that is below the rigid body, the capability being to retain substantially all of the bulk material on the bottom and within the rigid body of the bucket that is within the soft-sides of the soft-sided bag.

The first strap arrangement can be further configured so that the strap end portions are releasable from the secured relationship to allow the bag and the bucket that are in the bulk material transfer orientation to move in the telescoped relationship relative to each other to allow the soft-sided bottom and the mouth to be positioned away from the mouth by a second distance greater than the first distance so that the soft-sides directly receive the bulk material from the rigid body of the bucket through the mouth to effect transfer of the bulk material into the soft-sided bag while the mouth is enclosed by the soft sides.

The mouth defined by the continuous perimeter of the rigid body can be defined by length and width dimensions and the bottom perimeter of the soft-sided bottom that corresponds to the continuous perimeter of the mouth of the bucket with which the bag is to be used is configured with length and width dimensions, and each of the length and width dimensions of the bottom perimeter is in the range of about zero to about four inches larger than the respective length and width dimension of the continuous perimeter of the mouth.

The bag can be configured specifically for use in containing bulk material received directly from the piece of the standard bucket of the equipment; and the soft sides extending from all around the bottom perimeter and away from the bottom perimeter are configured in a plurality of sections, a first of the sections extending along the extent corresponding to the hollow rigid body of the bucket of the equipment with which the bag is to be used and being dimensioned to extend over the hollow rigid body, a second of the soft sides being configured to extend from the first section past the hollow rigid body and to terminate at the opening of the bag.

The piece of equipment with which the bag is to be used can be configured to invert the bucket from a bulk material carrying orientation with the mouth above the rigid body to the bulk material transfer orientation with the mouth below the rigid body, the piece of equipment being further configured to move the inverted bucket out of the bag, the arrangement of straps being further configured to release the configuration that urges the soft-sided bottom against the perimeter of the mouth, the release of the release configuration allowing the inverted bucket to move out of the bag and to no longer retain the bulk material in the rigid body, the configuration for the release being a strap with opposite strap end portions, one end portion being a loop and the other end portion being bendable to define a slip knot with the loop, the slip knot being releasable to separate the straps and to permit the movement out of the bag and being re-formable to permit a re-tightening of the strap upon the movement of the inverted bucket out of the bag, the re-tightened straps being configured to extend from the bag around the bucket to carry the bag and the bulk material that is no longer retained in the rigid body.

The second of the soft sides that extends from the first section can be further configured by dimensions to extend over the bulk material received in the first section and to be gathered to close the opening of the bag.

Still another embodiment provides the soft bottom and soft-sides configured from woven polypropylene having a characteristic of porosity with respect to liquids and containment of particles; the bulk material loaded in the bag comprises particles of sand mixed with liquid water; and the bag is a first bag further configured with a burst strength sufficient to retain the particles of sand even under the force of other similar loaded and closed bags placed on top of the first loaded and closed bag, the woven polypropylene of the first bag allowing the liquid water to pass out of the closed bag while the polypropylene retains the sand in the first closed container.

Yet another embodiment provides a soft-sided container configured to be loaded with bulk material directly from a bulk material bucket attached to a standard excavating or front loader equipment, the bucket being characterized by a hollow rigid body into which and from which the bulk material is transferred via a mouth of the bucket, the soft-sided container includes a soft-sided bottom configured with a bottom corresponding to the mouth of the bucket, a plurality of soft sides extending from all around the bottom and away from the bottom along an extent corresponding to walls of the bucket, the soft sides being configured to terminate at an opening of the soft-sided container, the configuration of the bottom being such as to fit across and close the mouth and the configuration of the soft sides being such as to extend from the bottom along the walls of the bucket, and a plurality of straps configured to extend across the soft-sided bottom that closes the mouth and across opposite ones of the soft-sides that extend along the walls of the bucket and being of length sufficient to extend from the opposite soft sides around the bucket, the straps being further configured with closure structure configured to be closed so as to secure opposite ones of the straps extending across the bottom and across the opposite soft sides and around the bucket to urge the soft-sided bottom against the mouth of the bucket and to close the mouth and retain substantially all of a unit of bulk material in the bucket upon orientation of the container and the bucket in a bulk material transfer orientation in which the soft-sided container bottom is under the mouth and the soft-sided container opening is above the soft-sided container bottom and substantially all of the unit of the bulk material is within both the bucket and the soft-sided container for direct transfer into the soft-sided container.

The closure structure of the straps can be configured to be releasable and re-closed and the straps are further configured with an extended length sufficient to allow the straps to extend across the bottom and across the opposite soft sides of the soft-sided container that is in the bulk material transfer orientation and to extend across an access space that separates the bucket from the container and to extend around the bucket to the respective closure structure so that upon release of the closure structure the straps extend to provide the access space and so that the re-closed closure structure secures the soft-sided container with the substantially all of the unit of the bulk material that is within the soft-sided container for hanging from the bucket for transport.

The plurality of straps can include a first strap arrangement and a second strap arrangement, wherein the second strap arrangement is configured to close the soft-sided container opening and retain the bulk material within the soft sides and on the soft-sided container bottom. Wherein at least a portion of each of the straps is secured to at least one of the side of the container and the bottom of the container.

The first strap arrangement and the soft-sided bottom and the soft sides can be collectively further configured to enclose and carry the unit of bulk material of a weight no less than a maximum weight that the bucket of the equipment to which the container configuration corresponds is rated to receive and carry so that the container is configured with a capacity to contain the entire unit of the bulk material.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings.

DETAILED DESCRIPTION

Several exemplary embodiments for simpler, more efficient method and system for packaging and handling bulk materials will now be described. It will be apparent to those skilled in the art that the present invention may be practiced without some or all of the specific details set forth herein.

Soft-sided containers, such as bulk material bags, offer advantages over metal containers or other hard-side containers, and over self-supported-side containers. In the latter containers a frame is built-into, or received in, the container, such as when cardboard liners are placed inside the container for support. These hard-side containers and self-supported-side containers are collectively referred to herein as "rigid-side containers". The above advantages result from the soft-sided bulk material bags being more spatially efficient than rigid-side containers. By way of example the soft-sided bulk material bag can be filled to capacity with practically zero airspace inside the bulk material bag.

The reduced airspace is one advantage because it eliminates wasted volume and such wasted volume can ultimately result in sinkholes or voids in landfills. The wasted volume also increases the transportation volume necessary for transport. These issues are specifically important in cases of packaging, transporting and storage of hazardous or radioactive and similar types of waste materials.

Another advantage of soft-sided containers is the storage space required for an empty soft-sided container. By way of example, about 6000 palletized, empty, two cubic yard-capacity, soft-sided containers can be loaded to form a single truck load (e.g., to fill a typical semi truck having an approximately 50 foot-long trailer having each of a width and a height of about 8 feet). When filled, the soft-sided containers of the truck load can hold about 12,000 cubic yards of bulk material 110. In one contrast, with respect to exemplary ones of the above rigid-side containers having the cardboard liners inside, only about 1000 empty, collapsible, two cubic yard-capacity, ones of such rigid-side containers 100, would be a full load in the same semi-truck. In another contrast, an additional advantage is that such a truck load of the soft-sided containers can be filled with up to 12,000 cubic yards of bulk material, whereas a truck load of the 1,000 empty, collapsible, two cubic yard-capacity, rigid-side containers can be loaded with only about 17% (i.e., about total 2000 cubic yards) of the bulk material 110.

Figure 1:
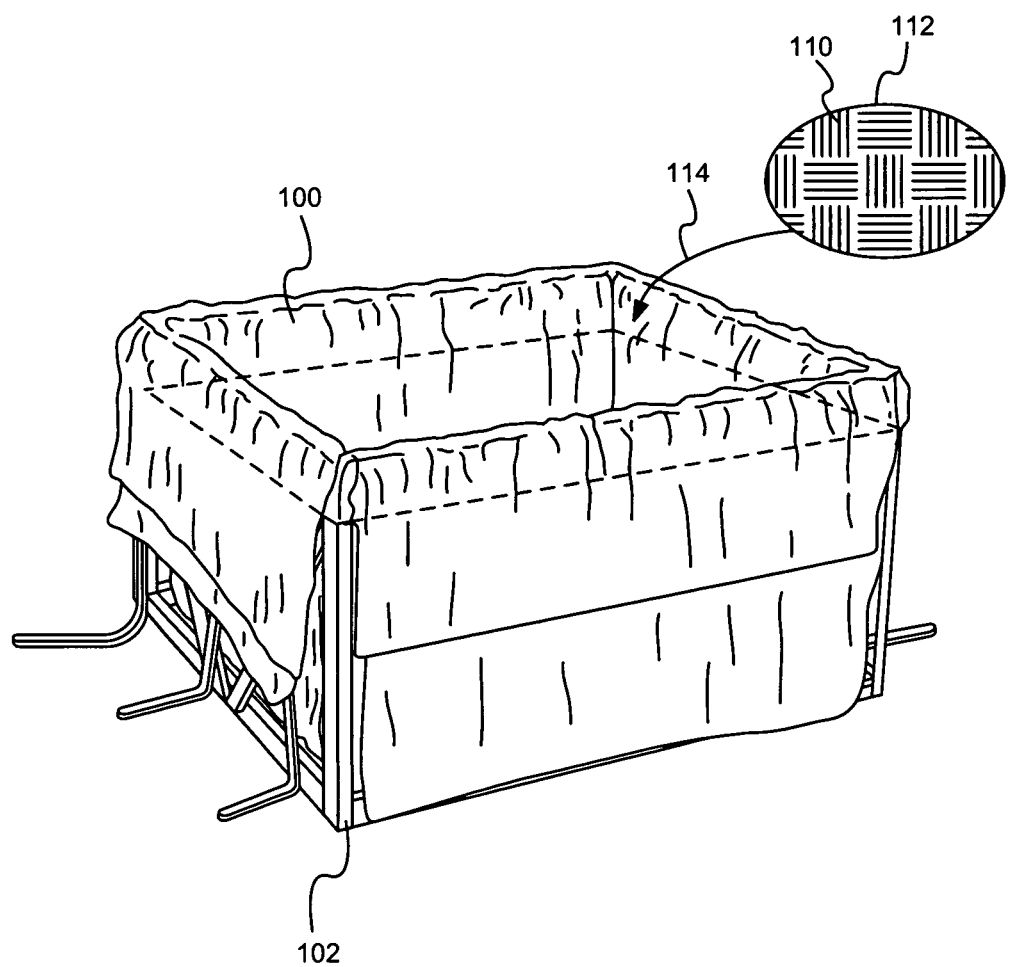
FIG. 1 is a simplified schematic of a typical soft-sided container supported in an external support frame.

As described with respect to FIG. 1 above, the typical bulk material supported soft-sided containers 100 require the external or internal support structure 102 which unnecessarily complicates the loading processes, requires excess labor and can expose the workers to the bulk material 110 an unnecessary number of times, and (regarding internal support) occupies too much space when the container 100 is collapsed.

According to embodiments of the present invention (herein referred to as "embodiments"), the embodiments are configured per a new and simplified approach that eliminates the external and internal support structure 102 and the set up requirements thereof. The new approach of the embodiments also requires only one, and the same single piece of, loading equipment to fill the soft-sided container, to lift the filled soft-sided container, and even to transport the soft-sided container short distances (such as tens to hundreds of feet to a separate on-site location or to load on a flatbed truck,), or in the case of dealing with flood emergencies, to move the filled soft-sided containers 300 to build a dike using many of those containers (e.g., by stacking such containers).

Further, pursuant to this new approach the embodiments of the soft-sided container and the one and the same piece of loading equipment are closed during more of the process than the typical rigid-side supported container 100 defined and described above. For example, the embodiments of the soft-sided container, and the bucket, are closed during transfer of the bulk material from the bucket into the soft-sided container, preventing the bulk material from escaping during transfer. Also, another aspect of such closing after such transfer is that the embodiments of the soft-sided container prevent the bulk material inside these embodiments of the soft-sided container from escaping during transport. These closing features are especially important in situations that include handling hazardous materials, and are beneficial for even non-hazardous materials such as sand or dirt because the closing features reduce the amount of dust generated. The dust generation can be hazardous from a visual perspective and disruptive to a local environment or neighborhood. Additionally, the embodiments may be configured for such closing features by straps arrangements of the container embodiments, in which straps extend around the soft-sided container embodiments and around a bucket that is inside such container embodiments for transfer of the bulk material. Further, embodiments of such straps may be integral components of the embodiments of the soft-sided container, and may be tied in a strap-to-strap manner, as with buckles or slip knots, e.g. (referred to below as "self-tying"). Advantages of such embodiments of the strap arrangements include assuring the noted closures of each of the standard buckets with which the embodiments are used.

Figure 2A:
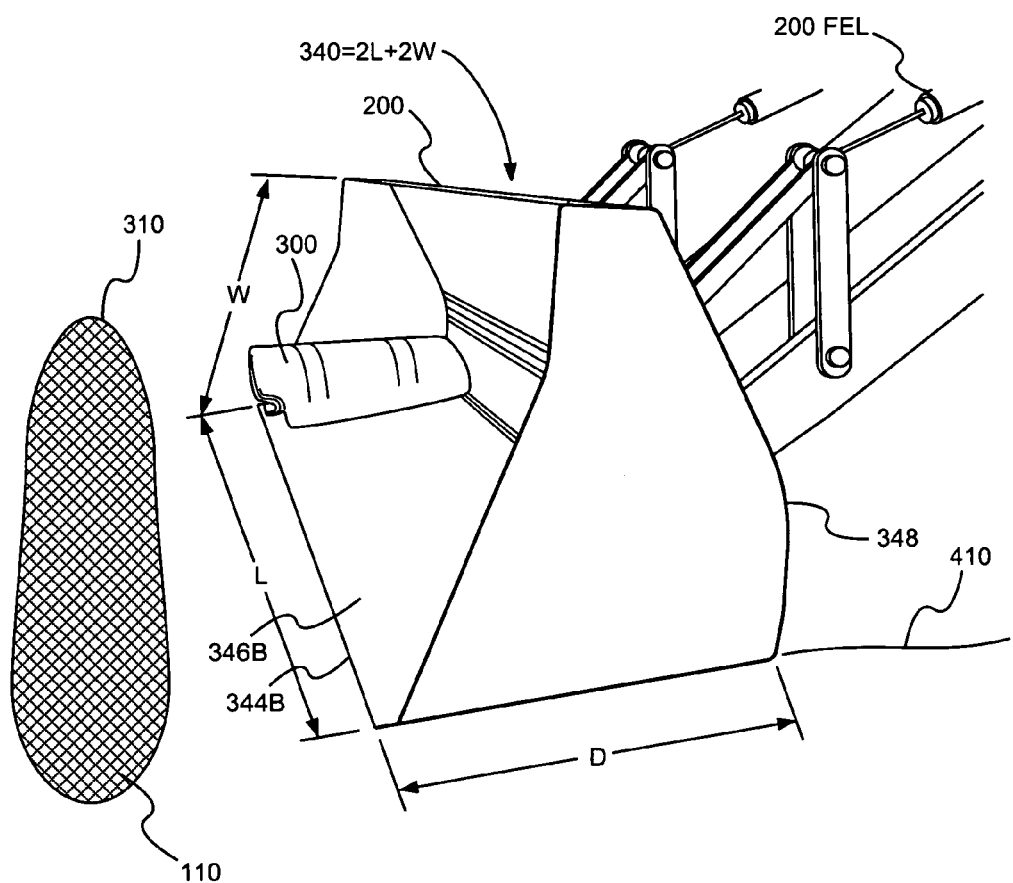
FIGS. 2A and 2B show buckets in accordance with the embodiments.
Figure 2B:
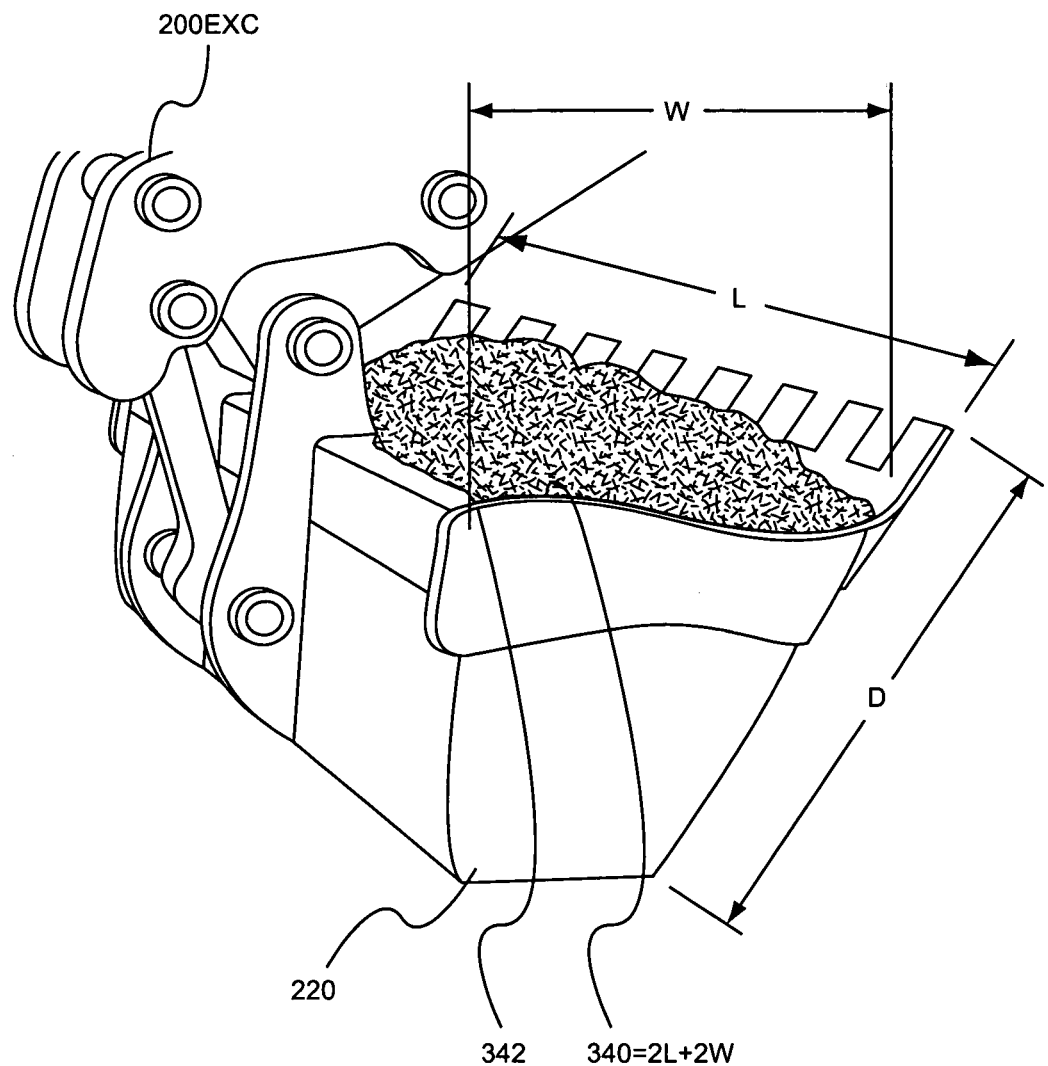
Figure 3A:
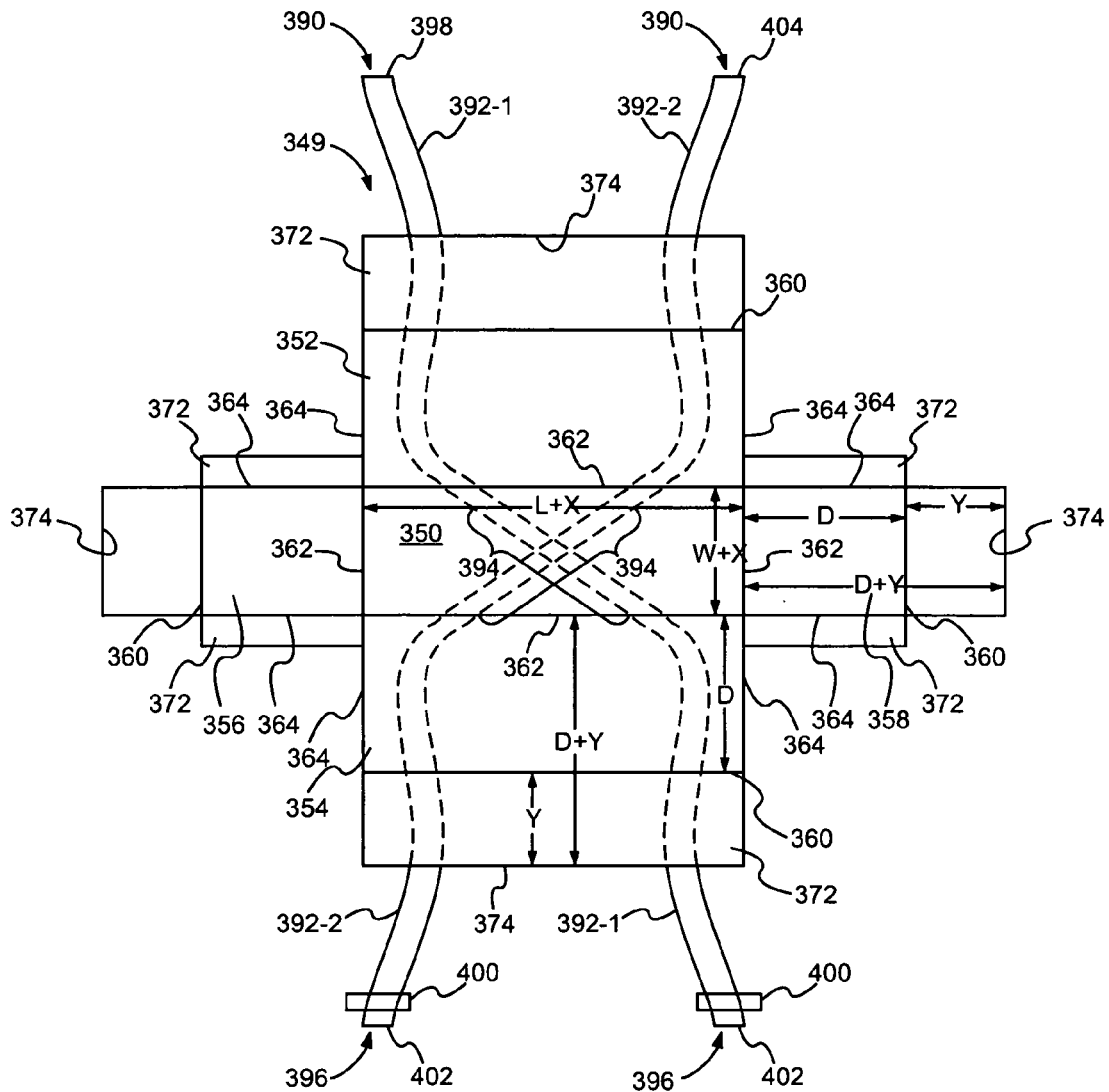
FIG. 3A is an exemplary pattern layout for a soft-sided container, in accordance with an embodiment.
Figure 3B:
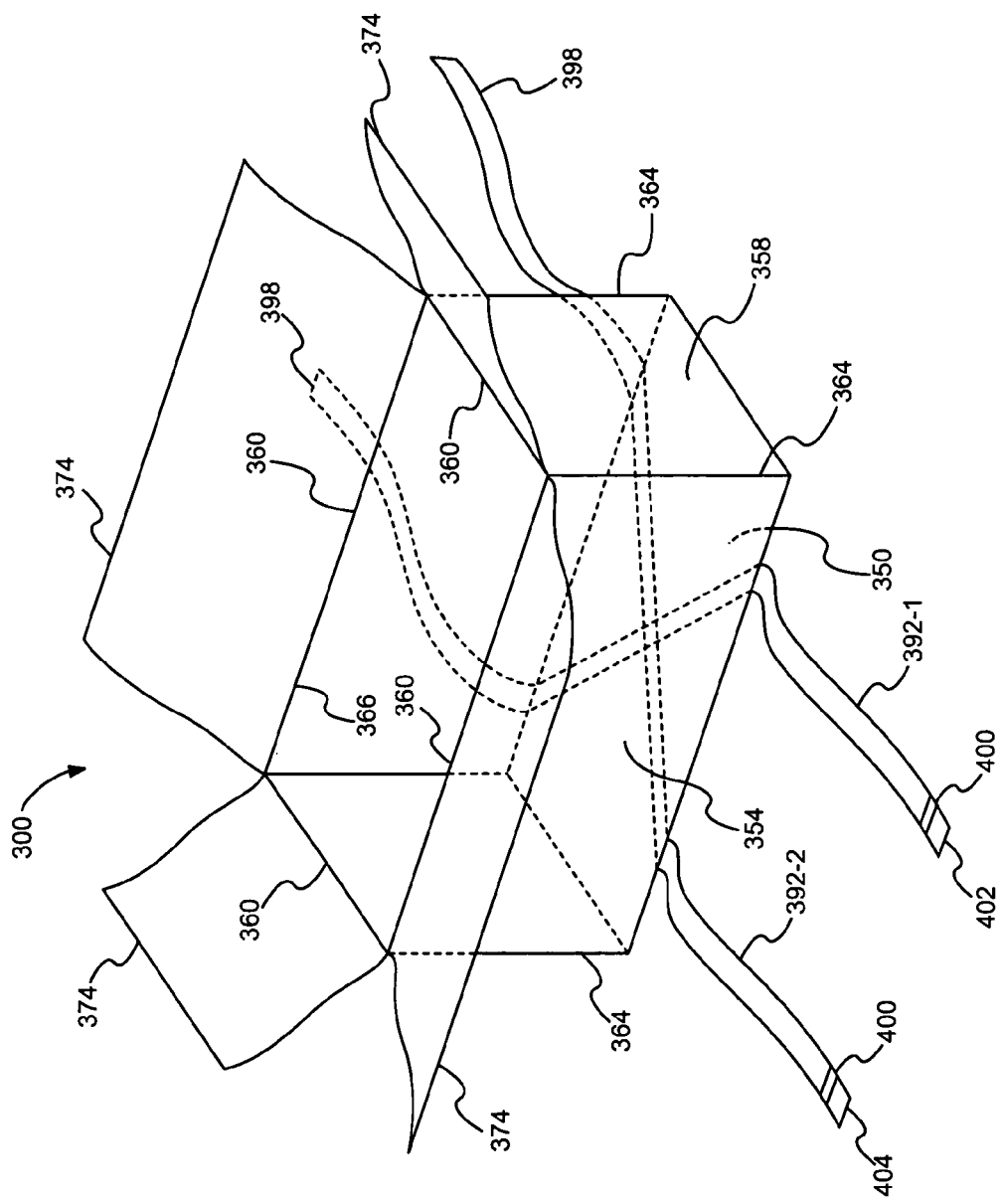
FIG. 3B is an exemplary a soft-sided container, in accordance with an embodiment.

The new approach of the embodiments includes soft-sided containers that are fitted to specific standard bucket sizes. FIGS. 2A and 2B show respective buckets 200, 220, in accordance with the embodiments. FIG. 3A depicts an exemplary pattern layout for a soft-sided container 300 (FIG. 2A), in accordance with an embodiment. FIG. 3B shows an exemplary one of the soft-sided containers 300, in accordance with an embodiment. It should be understood that while a substantially rectangular soft sided container is described herein, other shaped (e.g., curved, trapezoidal, more triangular, etc.) soft-sided containers can be used as maybe necessary to correspond with an associated standard bucket 200, 220.

The bucket 200 (FIG. 2A) is a typical standard bucket of a standard front end loader 200FEL. The equipment bucket 220 (FIG. 2B) is a typical standard bucket of a standard excavator 200EXC. FIGS. 5A-5I show a Model JCB 214 back hoe/loader, in which both a standard front end loader 200FEL (FIG. 5A) and a standard excavator 220EXC (FIG. 5C) are on the same piece of equipment, i.e., on the same piece of the JCB 214 equipment. The different standard buckets 200, 220 are configured with a wide range of sizes, with exemplary sizes including a one cubic yard-capacity front-end loader bucket 200 (e.g., a 1.5 cubic yard bucket 200 on the Model JCB 214) or excavator bucket 220 or smaller or larger capacity front end loader or excavator buckets (e.g., a ½ cubic yard bucket 220 on the Model JCB 214). For use with the embodiments, it is preferred that this wide range may be from between about 0.1 to about a 30 cubic yard-capacity, and it is more preferred that this wide range may be from about 0.1 to about a 12 cubic yard-capacity; and it is most preferred that this wide range may be from about one to about a six cubic yard-capacity. In further examples, a Model 914 standard front loader sold by Caterpillar Inc. is in 2009 offered with any of six standard front loader buckets 200 spanning a range of from 1.2 cubic yards to 2.8 cubic yards for use by general purpose contractors. In yet further examples, a Model 320 standard excavator sold by Caterpillar Inc. is also offered in 2009 with any of six standard excavator buckets 220 spanning a range of from 0.59 cubic yards to 1.96 cubic yards for use in general trenching and excavating. Another Model 988 of front end loader offered in 2009 by the same company has ten buckets 200 in a range of 6.5 cubic yards to 11.5 cubic yards.

In the industry, and herein below, the "cubic yard" term is referred to as a "yard", e.g., "one yard" corresponds to a one cubic yard size bucket.

Below, a bucket 200 or a bucket 220 is described in terms of a length equal to L, a width equal to W and a depth equal to D. By way of example a typical two-yard bucket 200 for a front end loader is about 96 inches in length (i.e., L=96 inches), about 36 inches in width (i.e., W=about 36 inches) and about 24 inches in depth (i.e., D=about 24 inches). Another typical size of bucket 200 has dimensions of: L=about 132 inches, W=about 48 inches and D=about 48 inches. Yet another typical size of bucket 200 has dimensions of: L=about 108 inches, W=about 36 inches and D=about 36 inches. It should be understood that these are merely exemplary sizes and other sizes could be used with the embodiments. As will be described below with respect to the embodiments, an embodiment of a soft-sided container 300 made from a blank shown in FIG. 3A corresponds in size to, i.e., is similarly sized to fit and function with, the size of a corresponding bucket 200, 220 with which the container 300 is to be used. In this sense, and as described in more detail below, these embodiments of the containers 300 are said to be "corresponding to", or "to correspond to", the bucket 200, 220 with which the container 300 is configured for use. Thus, it may be understood that the containers (or bags) are configured specifically for use in containing the bulk material 110 received directly from the standard bucket 200, 220 of the piece of equipment to which the bag corresponds.

Figure 3C:
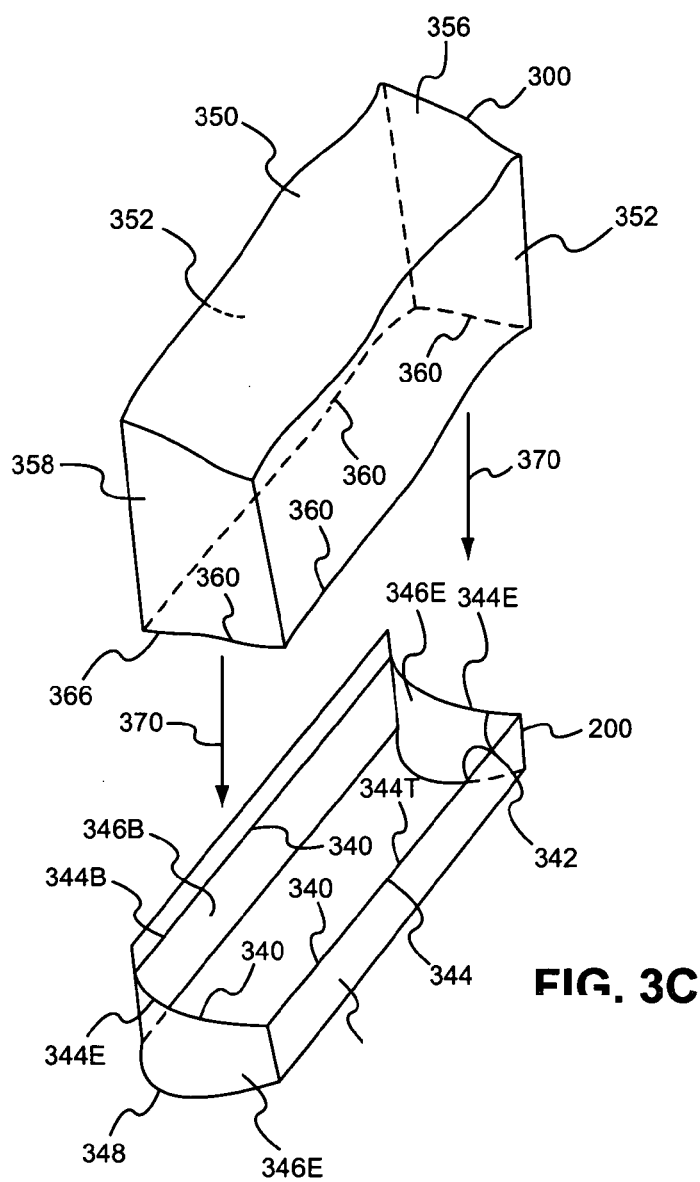
FIGS. 3C and 3D show an embodiment configured as the soft-sided container being fitted on a corresponding bucket.

The foregoing references to "standard" buckets 200, 220 may be understood by the following. Using a front end loader 200FEL as an example (e.g., FIGS. 2A & 5A), each of the front end loaders 200FEL and the bucket 200 that is attached to such loader for use (i.e., with which the loader is "associated") is a "standard" bucket. Most generally, a "standard" bucket 200 is sold with a standard front loader 200FEL for general applications. Those applications may include scooping bulk material 110 (FIG. 5A) into the standard bucket from a pile 310, lifting and transporting the bulk material 110, and dumping the bulk material 110 into a truck, for example. As described below, such standard equipment buckets 200, 220 are not specially-configured for filling any particular container. In a specific manufacturer's line of front loaders 200FEL, each different model number standard bucket may have a different standard configuration e.g., a different total load-carrying capacity, and/or shape. In more detail, each such "standard" bucket 200, 220 is characterized by the above-defined dimensions L and W. As shown in FIGS. 2A and 2B, these dimensions define a continuous perimeter 340 of a mouth 342 of the bucket 200, 220, where perimeter 340=2L+2W. As most easily seen schematically in FIG. 3C, the perimeter 340 (and mouth 342) are structurally comprised of edges of walls of the bucket 200, 220. Specific edges are identified by 344 plus a letter (or generally by 344), and specific walls by 346 plus a letter (or generally 346). The walls 346 define a hollow rigid body having depth D (FIG. 2A). The walls include end walls 346E (see edges 344E) connected to a blade wall 346B to which may be attached a BOCE edge (a bolt-on-cutting edge, see edge 344B). Walls 346 also include a top wall 346T (see edge 344T). The walls 346 are configured so the hollow rigid body defines the weight-capacity of the bucket 200, 220. The walls 346 also define a volume V of the bucket 200, 220, which is in terms of the "yards" of a particular bulk material 110 that the bucket 200, 220 is able to carry when the bucket 200, 220 is oriented in a "bulk material carrying orientation" (herein "BMC orientation"). A preferred BMC orientation is generally shown in FIG. 3C, and is more particularly shown in FIG. 5A, with respect to the exemplary front end loader bucket 200, and is shown in FIG. 2B with respect to the exemplary excavator bucket 220. As viewed in FIG. 3E, this BMC orientation is characterized by the mouth 342 being up, i.e., above, relative to the walls 346 and to a base 348. As viewed in FIG. 3C the perimeter 340 and edges 344 are generally horizontal and above the base 348 of the bucket 200, 220 at which the walls 346 meet to define the hollow rigid body. The edges 344 extend continuously around the mouth 342 of the bucket 200, 220. In review, in terms of the "standard" bucket 200, 220, each such "standard" bucket 200, 220 may have any of various dimensions and/or shapes of the walls 346 and of the edges 344. However, as used herein, each "standard" bucket 200, 220 is characterized by having, or being configured with, the above-described mouth 342 through which the bulk material 110 enters the bucket 200, 220, and exits the bucket 200, 220.

Those skilled in the art will recognize that the entry of the bulk material 110 into the bucket 200 is generally facilitated (FIG. 2A) when the operator of the exemplary front end loader 200FEL lowers the bucket 200 with the blade wall 346B generally horizontal and close to the ground (or support surface) 410 on which a pile 310 rests, and with the mouth 342 tipped at an angle (e.g., 30 degrees) with respect to vertical. Then, the front loader 200FEL is moved toward and into the pile 310, which is part of a "scooping" operation. In scooping, the BOCE edge 344B enters the pile 310 generally under the pile. Also, the bucket 200 is rotated (e.g., clockwise in FIG. 2A) to move the mouth 342 toward horizontal (FIG. 5A) while the bucket 200 is raised off the ground and through the pile 310. The blade wall 346B and top wall 346T are moved to a position with the base 348 below the horizontal mouth 342 (FIG. 5A), which is the BMC orientation. With respect to the excavator bucket 220, FIG. 2B shows the bucket 220 at the end of the scooping, rotated and carrying (i.e., holding) a load of bulk material 110 having a volume V about equal to the carrying volume of the bucket 220. FIG. 2B thus shows the exemplary BMC orientation of the excavator bucket 220.

Those skilled in the art will also recognize that the transfer of the bulk material 110 from the bucket 200 is generally facilitated when the operator of the exemplary front end loader has the bucket raised above the ground, and in a reverse rotation (counterclockwise in FIG. 2A) when the bucket 200 is moved from the bulk material carrying orientation past the orientation shown in FIG. 2A (with the blade wall 260B generally horizontal) and to an orientation in which the mouth 342 is generally horizontal and below the hollow rigid body and walls 346 of the bucket 200. This orientation is referred to as a "bulk material transfer orientation" (herein "BMT orientation"), it being understood that such BMT orientation is mouth-side down so that the bucket 200 does not vertically retain the bulk material 110 against the force of gravity. In this manner, the equipment (e.g., 200FEL) with which the bag 300 is to be used is configured to "invert" the bucket 200, 220 from the BMC orientation with the mouth 342 above the rigid body to the bulk material transfer orientation (also referred to as the BMT orientation) with the mouth 342 below the rigid body.

Now considering an embodiment, as shown in FIG. 3A the soft-sided container 300 is configured from a blank (or sheet) 349. The sheet 349 is configured with a bottom 350. The bottom configuration is configured with a length equal to a sum of L+X and a width equal to a sum of W+X where X is equal to a range of between about zero to about four inches. Thus, the bottom perimeter of the soft-sided bottom 350 that corresponds to the continuous perimeter 340 of the mouth 342 of the bucket 200, 220 with which the bag 300 is to be used is configured with the length L and width W dimensions. Each of the length L and width W dimensions of the bottom perimeter of the bottom 350 is in the range of about zero to about four inches larger than the respective length L and width W dimension of the continuous perimeter 340 of the mouth 350. By this range, the bottom 350 will accommodate different heights of heaping bulk material 110 received in the bucket 200, 220, and will still cooperate with the mouth 342 as described below. The blank 349 of the soft-sided container 300 is also configured with sides 352, 354 having a length equal to a sum of L+X and a depth equal to D+Y, where Y is a dimensional value of a closure flap 374. The blank 349 is also configured with ends 356, 358 having a width equal to a sum of W+X and a depth equal to a sum of D+Y. It is to be understood that as used in FIG. 3A, L, W and D are the respective length, width and depth of a corresponding bucket 200, 220 (i.e., a particular bucket 300 with which the particular container 300 is to be used). The X value slightly enlarges the length (L) and width (W) of the soft-sided container 300 configured from the blank 349 to more easily allow the soft-sided container to be used as will be described in more detail. The sides 352, 354 and the ends 356, 358 of the blank 349 terminate as defined by lines 360. Also, lines 362 indicate locations at which the blank 349 is bent upwardly to position edges 364 next to each other to be joined so as to convert the blank 349 into a three-dimensional open-top shape of the soft-sided container 300, as described below and as shown schematically in FIGS. 3B & 3C. Such shape of container 300 is configured with the lines 360 defining an opening 366 of the container 300. With the edges 364 joined, the opening 366 of the container 300 is opposite to the bottom 350, and the sides 352, 354 and ends 356,358 extend from the bottom 350 to the opening 366. With respect to the three-dimensional container 300, the ends may be referred to as part of the sides 352, 354.

Figure 3D:
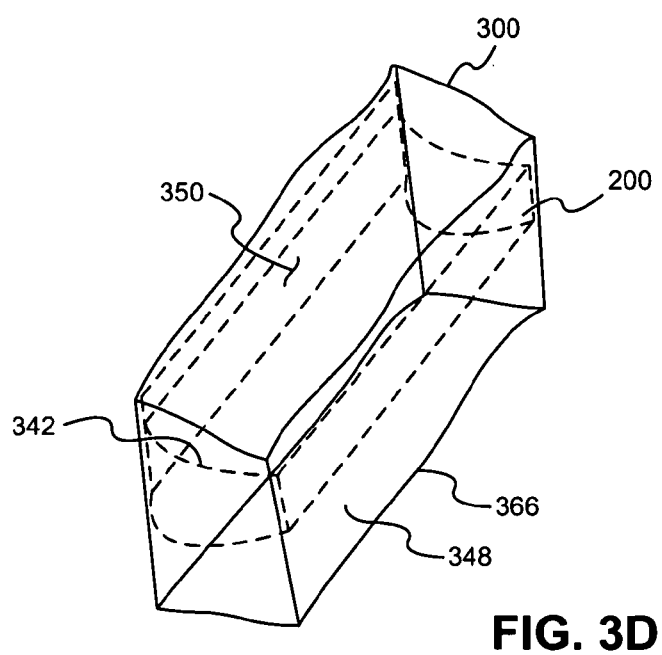

FIGS. 3C and 3D show an embodiment configured as the soft-sided container 300 being fitted on a corresponding bucket 200. Such fitting is also referred to below in terms of telescoping of the container 300 and bucket 200, 220, and of the container 300 covering the bucket 200, 220. As shown in FIG. 3C with respect to a preferred embodiment, the container 300 and the bucket 200 are initially spaced apart vertically, with the exemplary bucket 200 in the BMC orientation. Thus, for the fitting, telescoping, and covering described below, the bucket 200 is aligned directly below the container 300 (as indicated by arrow 370). Arrow 370 also points in a downward direction of movement of the container 300 during the fitting or telescoping or covering. In FIG. 3C the soft-sided container 300 is also shown open, in that the opening 366 is aligned with the corresponding open mouth 342 of the bucket 200. Generally, moving the soft-sided container 300 in direction 370 moves the opening 366 downwardly past the mouth 342 to snugly cover the corresponding bucket 200 with the soft-sided container 300, as shown in FIG. 3D. This moving of the container 300 may also be described as fitting the container 300 over the bucket, or telescoping both the bucket and the container. The "snugly" covering results from selecting the value of dimension "X" described above so that the sides 352, 354 of the container 300 are close to the walls of the bucket 200, 220, yet the sides are movable (slidable) along the walls 346 so that the container and the bucket may become telescoped as shown in FIG. 3D and described below. Thus, the container 300 having the value "X" added to L and to W, is said to "correspond to" the bucket 200, 220 that the container 300 is to snugly cover.

Figure 5A:
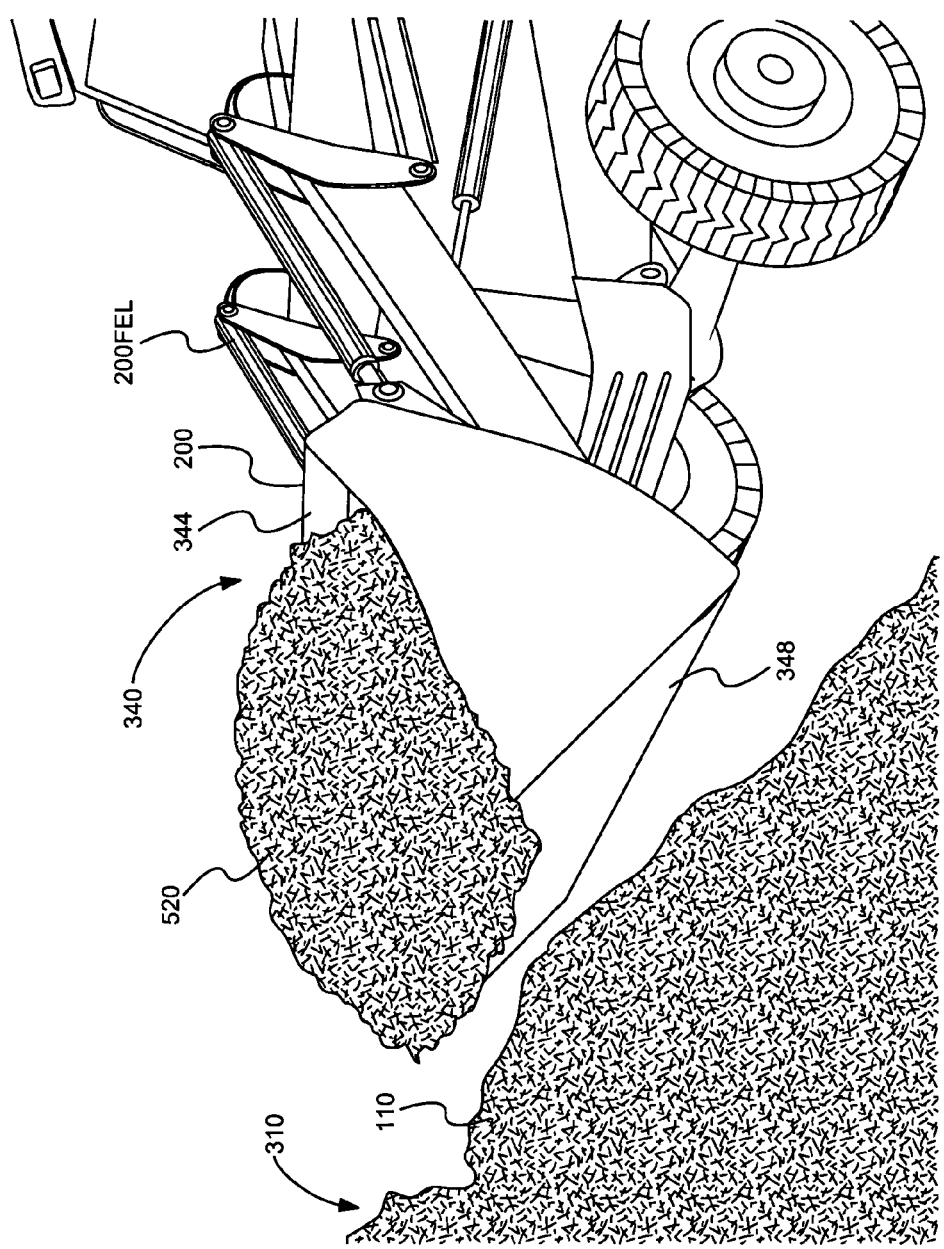
FIGS. 5A-5I illustrate the method operations performed in packaging bulk material with a soft-sided container, in accordance with the embodiments.

It should be understood that for the above generally-described moving of the soft-sided container 300 in direction 370 to snugly cover the corresponding bucket 200 with the soft-sided container 300, the bucket 200 can be in other orientations. Such other orientations may include the mouth 342 tipped at various angles with respect to horizontal. For example, FIG. 5A shows the mouth 342 tipped at about ten to fifteen degrees from horizontal, which is an orientation (a BMC orientation) suitable for carrying a heaped load of bulk material 110, wherein the heaped load generally equals the entire volumetric capacity that the bucket 200 is configured to carry and does not exceed the maximum weight capacity of the bucket 200, 220. Thus, the equipment (e.g., 200FEL) with which the bag (or container 300) is to be used is configured to have a maximum weight-carrying capacity, which is defined by a maximum weight value of the bulk material 110 that the standard bucket 200, 220 is permitted to receive. This maximum weight-carrying capacity is known in the equipment industry as the "break-out force". The range from horizontal to fifteen degrees from horizontal is referred to as "generally horizontal". It is to be understood that as the angle of the mouth from horizontal increases from that shown in FIG. 5A, the bucket will generally be able to carry and retain less and less of the bulk material 110. Nonetheless, if this less-desired transfer of such lesser amounts of the bulk material 110 into an embodiment of the container 300 is desired, then the above-described covering may be effected using the embodiments of the container 300 even though the full capacity of the container 300 will not be used.

Such fitting, telescoping, and covering may be described with respect to the exemplary standard open-top bucket 200 that is attached to the bulk material handling equipment (that may be an exemplary front end loader 200FEL). That bucket 200 is configured with the mouth 342 at an open-top (surrounded by the perimeter 340). As described above, the mouth 342 is configured to receive and discharge the bulk material 110 that is to be transferred or packaged. This covering is by the bottom 350 of the single soft-sided container 200, and the bottom is configured to span the mouth 342 as shown in FIG. 3D. To facilitate such covering, the bottom 350 may be a soft-sided bottom configured with a bottom perimeter corresponding to the continuous perimeter 340 of the equipment with which the container 300 (or bag) is to be used, which equipment may be the loader 200FEL having the exemplary bucket 200. Also, the sides 352, 354 are soft and extend from all around the perimeter of the bottom 350 and away from the bottom perimeter along an extent corresponding to the hollow rigid body of the exemplary bucket 200, which is of the equipment 200FEL with which the bag is to be used. The soft sides 352, 354 are configured to terminate at, and define, the opening 366.

As described in more detail below, this covering may also be understood in terms of "telescoping", in which a first item is positioned relative to (e.g., over) a second item in the general manner of two overlapping and slidable pieces, as in a telescope. In the embodiment, the first item is the hollow empty soft-sided container 300, also referred to as a bag. The second item is the exemplary standard open-top bucket 200 attached to the bulk material handling equipment (in the form of the front end loader 200FEL). The bucket 200 is again configured with the mouth 342 extending around the open-top (i.e., around the perimeter 340) and with the walls 346 extending from the mouth 342 to the base 348 of the bucket 200. The telescoping orients the bucket 200 with the mouth 342 facing up (generally horizontal, FIG. 2B, in re bucket 220) to contain the full load of bulk material 110 (e.g., in the BMC orientation). The telescoping further orients the bottom 350 of the bag (container 300) across the open-top (mouth 342) of the bucket 200 with sides 352, 354 of the bag hanging from the mouth 342. As shown, the bottom 350 spans the entire mouth 342.

Figure 3E:
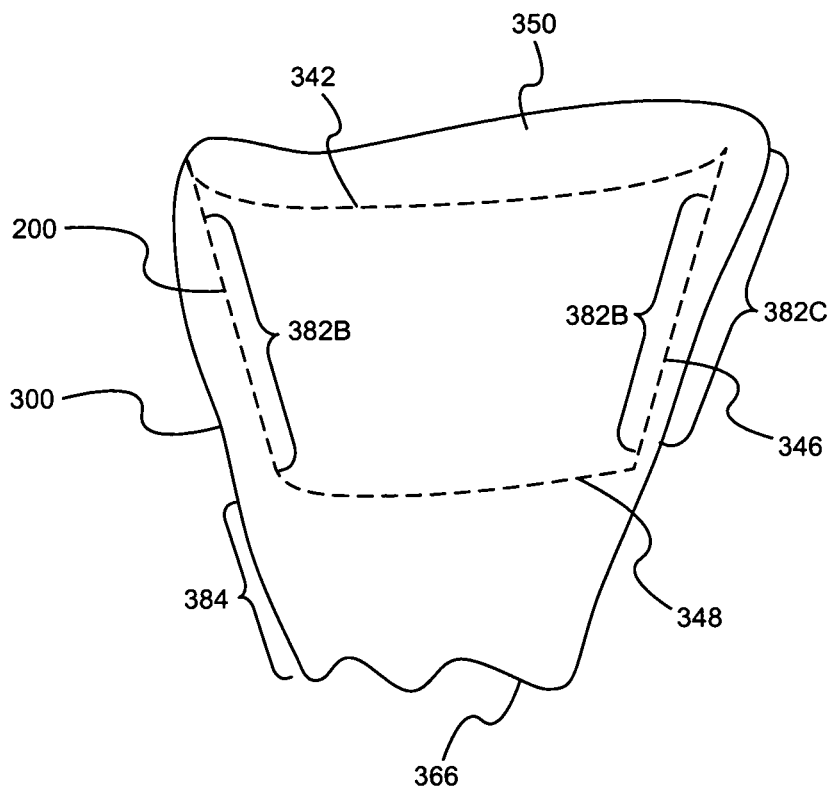
FIG. 3E is an end view of the telescoped bag and bucket that are in the BMC orientation.

In review, the correspondence of the configurations of the soft-sided bottom 350 and soft sides 352, 354 with the respective continuous perimeter 340 and with the hollow rigid body of the exemplary bucket 200 may be understood as follows. This correspondence is to allow the soft-sided bag 300 to assume a telescoped relationship that results from the above-described telescoping, in which the bag 300 is (FIG. 3D) over the hollow rigid body. FIG. 3E is an end view of the telescoped bag 300 and bucket 200, with the bucket 200 in the BMC orientation. FIG. 3E shows the soft sides 352, 354 configured with a section 382C generally parallel to and coextensive with a portion 382B of the rigid body and with the soft-sided bottom 350 extending completely across and over the mouth 342. Continuing the review, the soft-sided bottom 350 is configured corresponding to the mouth 342 of the bucket 200. The container 300 is configured with a plurality of the soft sides 352, 354 extending from all around the bottom 350 and away from the bottom 350 along the extent (or section) 382C corresponding to walls 346 of the bucket 200. The soft sides 352, 354 are configured with a section 384 corresponding to the closure 374 in FIG. 3A to extend past the bucket and terminate at the opening 366 of the soft-sided container 300. The configuration of the bottom 350 (with the possible added "X" dimension described above) is such as to fit across and close the mouth 342 and the configuration of the soft sides 352, 354 (and the ends 356,358) is such as to extend from the bottom 350 along the walls 346 of the bucket 200 (FIG. 3D) and then to the opening 366.

Covering the bucket 200 with the soft-sided container 300, e.g., in the manner of the described telescoping and telescopic relationship, allows easier, simpler, and faster use, and increased safety in the use, of the embodiment of the soft-sided container 300. For example, the soft-sided container 300 is further configured as described below to be secured over the standard bucket 200, 220 with the bottom 350 of the container 300 held against the mouth 342 to close the open-top (i.e., mouth 350) of the standard bucket 200, 220. In another example, the configuration of the container 300 secures the telescoped empty container (e.g., bag) to the standard bucket 200, 220 that contains the bulk material 110 so that the bottom 350 of the bag is held against the mouth 342 to close the open-top (mouth 350) of the standard bucket 200, 220.

Soft-sided containers 300 are also simpler and less expensive to manufacture than a comparably sized semi-rigid or other rigid-side container. Soft-sided containers 300 also include less volume of materials than a comparably sized semi-rigid or rigid-side container because the container 300 does not include or require any support structure 102, for example. As a result the soft-sided containers 300 are more cost effective and volumetrically efficient than comparably sized semi-rigid or rigid-side containers (e.g., the above-described supported soft-sided containers shown in FIG. 1).

In more detail, embodiments of the soft-sided bag 300 are configured to be loaded from the standard bulk material bucket 200, 220 of an excavating equipment (e.g., 220EXC) or front end loader equipment (e.g., 200FEL). The loading is with bulk material 110 and without requiring use of the support structure 102 that maintains the bag 300 in an open top and upright configuration during receipt of the bulk material 110 into the bag 300. Instead of such support structure, with the exemplary bulk material bucket 200 being characterized by the hollow rigid body (e.g., walls 346, ends 346 and base 348) into which and from which the bulk material 110 is transferred via the mouth 342 defined by the continuous perimeter 340 of the rigid body, and with the bag 300 configured for the described telescopic relationship, the bucket 200 itself serves multiple functions, including containing the bulk material 110, and shaping and carrying the bag 300 for direct reception of the bulk material 110, as well as added functions as described below.

Referring again to FIG. 3A, the embodiments of the soft-sided container 300 can be manufactured from any suitable material including for example a woven fabric or sheet of polyolefin, polypropylene, polyethylene, or combinations thereof or similar materials in a suitable weight such as between about 6.5 and about 8.5 oz per square yard. Heavier weight and lighter weight materials can also be used. The soft-sided container 300 can be substantially water resistant and/or water proof and/or capable of being impermeable to a desired liquid or fluid. Such impermeability may be achieved in one embodiment in which the blank 349 is configured from woven polyester (a fine weaving yarn), and the woven polyester is coated on both sides with polyethylene (e.g., a ½ mil coating on each side of the blank 349). In another embodiment, the container 300 may be configured for use in emergencies (e.g., building levees to withstand flooding), and the woven fiber is intentionally not coated, resulting in the container sides 352, 354, and bottom 350 being pervious to liquid yet impervious to bulk materials, e.g., sand. In such emergencies the sand is often very wet (mixed with liquid) and the pervious characteristic allows the liquid to pass through the sides 352, 354 and bottom 350 when the container 300 is lifted or stacked under another container, for example. The soft-sided container 300 can also be configured to include multiple layers of material.

The embodiments of the soft-sided container 300 can be configured from one piece (or blank) 349 of material as shown in FIG. 3A or can be configured and manufactured from multiple pieces of material (e.g., where the one or more of the bottom 350, sides 352, 354 and the ends 356, 358 can be separate pieces of material). Optional sewing flaps 372 can be included to allow the ends 356, 358 to be more easily bonded or sewn to the corresponding sides 352, 354. The soft-sided container 300 can include seams that can be bonded (e.g., thermally) or sewn together such as with a 5000 denier polypropylene twisted thread. The container 300 is configured with a closing (or closure) flap 374.

As described above, the embodiments of the soft-sided container 300 are configured to be secured over the standard bucket 200, 220 with the bottom 350 of the container 300 held against the mouth 342 to close the mouth of the standard bucket 200, 220. In more detail, the soft-sided container 300 is configured with strap arrangements. A first strap arrangement 390 is configured for many functions, including securing one of the containers 300 with a corresponding bucket 200, 220 in the telescopic relationship, and lifting the soft-sided container 300. The strap arrangement 390 can be configured from any suitable material such as a nylon webbing of sufficient weight and strength as needed for the particular size and weight-carrying-capacity of the soft-sided container 300 to which it is connected. By way of example straps 392 may be configured from about 2 inch wide nylon webbing having a tensile strength of 6000 pounds. It should be understood that wider or narrower straps 392 could be used and the straps 392 could be layered to increase strength. More than two straps 392 can be used in the strap arrangement 390. By way of example, a single pair of crossing straps 392 is shown in FIG. 3A, however multiple pairs of crossing straps 392 or non-crossing straps 392 and combinations thereof can be used.

The straps 392 can be bonded (e.g., sewn) to the soft-sided container 300 such as with a 5000 denier polypropylene twisted thread. By way of example the straps 392 can be sewn to the soft-sided container 300 in locations (see bracket 394, FIG. 3A). In one embodiment, at least a portion of each of the straps 392 is secured to a location 394 of at least one of (1) the side 352, 354 of the container 300 and (2) the bottom 350 of the container 300, for example. In a preferred embodiment, as further shown in FIG. 3F, the straps 392 can be configured with a buckle system 396 to facilitate securing one end 398 of one strap 392-1 to a buckle 400 that is secured to another end 402 of that strap 392-1 to facilitate a self-tied (or self-secured) connection between the ends 398 and 402 of the one strap 392-1. The ends 398 and 402 may be referred to as pairs of ends. In another embodiment, the self-tied ends may be one end 402 of one strap 392-1 and an opposite end 404 of a second strap 392-2, and in this embodiment all of the pairs of ends would be self-tied to a respective buckle, for example. The strap arrangement 390 may include other specific closures, such as slip rings, D-rings, cam locking buckles, and slip knots, for example, to achieve the described self-tying.

Figure 3F:
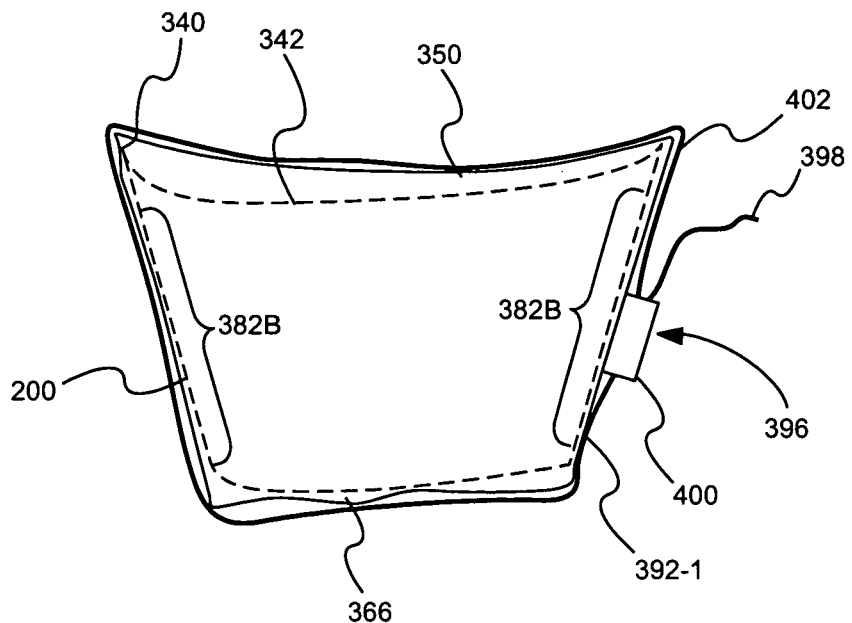
FIG. 3F is an end view of the telescoped bag and bucket that are in the BMC orientation with the straps secured.
Figure 3G:
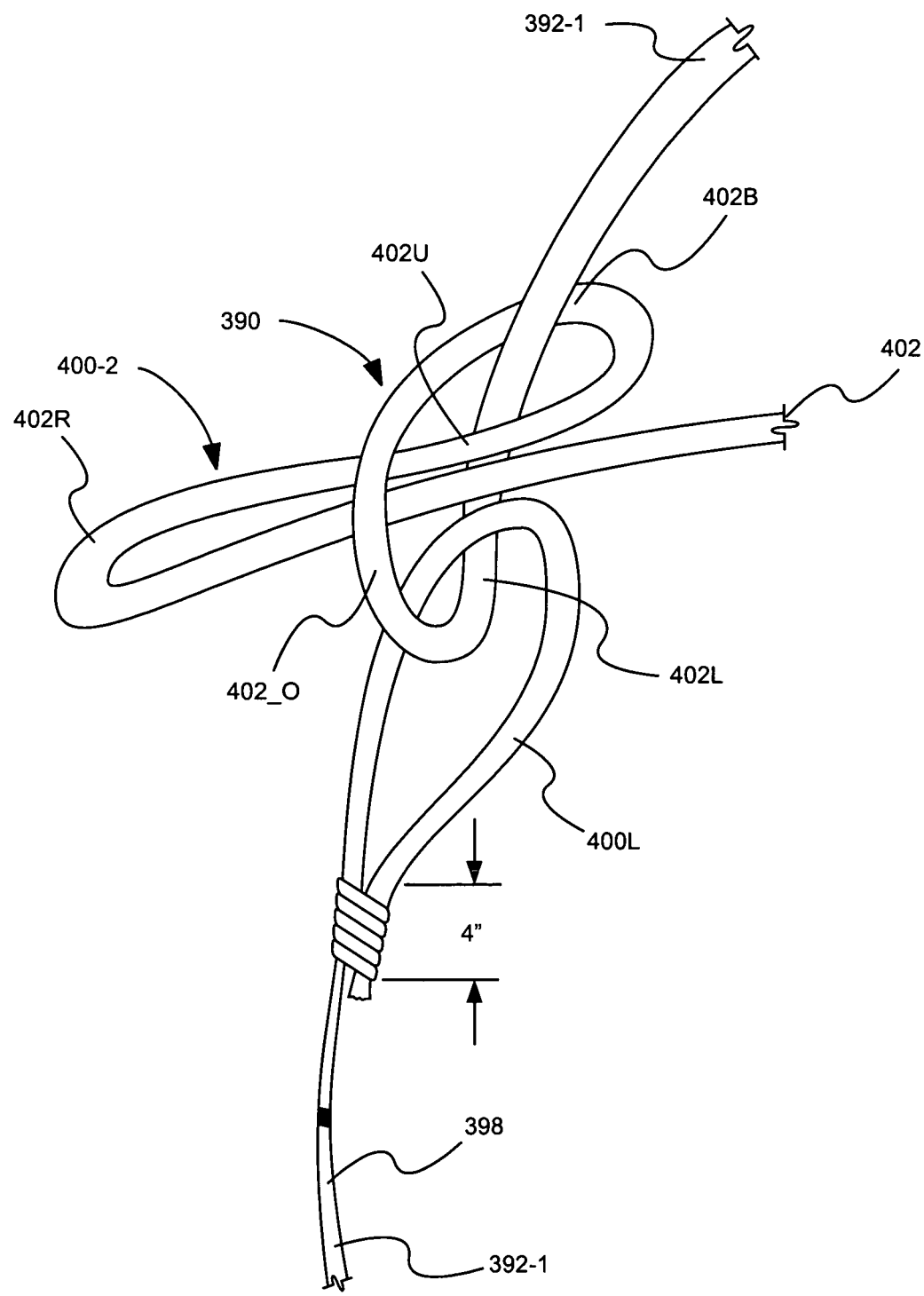
FIG. 3G is a strap arrangement configured in the form of a slip knot to facilitate securing the one end of the one strap to the other end.

In a more preferred embodiment, as shown in FIG. 3G the straps 392 can be configured with the strap arrangement 390 in the form of a slip knot 400-2 to facilitate securing the one end 398 of the one strap 392-1 to the other end 402 of that strap 392-1 to facilitate the self-tied connection between the ends 398 and 402. To provide the slip knot 400-2 the end 398 is configured with a loop 400L, that may extend eight inches and be sewn four inches long to itself. Also, the other end 402 is configured to extend through the loop (see 402L) and then to extend over the loop 400L (see 402O) and then to extend behind itself (see 402B) and then to extend in front of itself and (to the left) under the extension 402O (see 402U) and to extend in a U-path (or reverse path) back out from under the extension 402O (see 402R). This combined configuration of the ends 398 and 402 defines the slip knot 400-2. The knot 400-2 is secured by pulling up on the portion 402O, which draws the strap 392-1 through the loop 400L and tight around the bag (and the bucket, as the case may be). This drawing makes slack in portion 402B. Then the two portions of the reverse path 402R are pulled to the left to take up the slack in portion 402B, while the strap 392-1 remains tight around the bag 300 and bucket 200, for example. The slip knot 400-2 thus securely joins the ends 398 and 402. The slip knot 400-2 is also releasable by pulling to the right (as viewed in FIG. 3G) on the end 402, to pull the two portions of the reverse path 402R out of the portion 402O, allowing the ends 398 and 402 to be separated. In one embodiment corresponding to a one-half yard excavator bucket 220, the straps 392 are configured with a total length of each strap 392 of about sixteen feet. In another embodiment corresponding to a 1.5 yard front end loader bucket 200, the straps 392 are configured with a total length of each strap 392 of about twenty-four feet. In each embodiment, the loop 400L may be in a range of about eight to about ten inches long.

In the foregoing manner, when the straps 392 are configured with lengths, e.g., as described above the straps will be configured to extend at least partially along and secured to the soft sides 352, 354 and be of length sufficient to extend around (see FIG. 3F showing extending completely around) the rigid body of the bucket 200, 220 corresponding to the container 300. In one embodiment of the strap arrangement 390 the straps 392 of the arrangement are further configured to urge the soft-sided bottom 350 against the perimeter 340 of the mouth 342 to close the mouth 342 and to retain substantially all of the bulk material 110 in the rigid body. Such closure may, for example, occur with the telescopic relationship shown in FIGS. 3D-3F, which is upon orientation of the container 300 and the bucket 200, 220 into the BMC orientation shown in FIGS. 3D-3F. In the BMC orientation the soft-sided bottom 350 is over the mouth 342 and the opening 366 of the container 300 is below the bottom 350 and the bottom 350 is under the mouth 342 and the opening 366 is above bottom 350 and substantially all of the bulk material is within both the rigid body of the bucket 200, 220 and within the soft-sided container 300. The first strap arrangement 390 and the soft-sided bottom 350 and the soft sides 352, 354 (with the ends 356, 358) are thus collectively configured to enclose and carry a unit of bulk material 110 (as defined by the bucket 200, 220), and the unit is of both a weight and a volume which the standard bucket 200, 220 of the equipment with which the bag is to be used (e.g., 200FEL) is configured to receive, carry, and transfer into the bag 300. Such enclosing and carrying may be in the BMC orientation.

In review, the strap arrangement 390 is a first strap arrangement. The configuration of the first strap arrangement 390 may include the straps 392 extending across and secured to the soft-sided bottom 350 to define an exemplary pattern (shown e.g., in FIG. 3A). Each strap 392 is configured with a strap end portion comprising the two strap ends (398 and 404) attached and extending from the path of the pattern. FIG. 3F shows that each strap end portion extends at least partially along a respective one of the soft sides 352, 354. Each separate strap 392 (with the combined lengths of the strap end portions) is of length sufficient to extend completely around the rigid body of the bucket 200, 220 and is configured to releasably join another of the strap ends in a secured relationship (e.g., buckled by buckle 400, or self-tied by the slip knot 400-2). As joined, the strap 392 is configured with tensile strength sufficient to urge the soft-sided bottom 350 against the perimeter 340 of the mouth 342, and collectively the straps 392 act on the bottom to close the mouth 342.

Figure 3H:
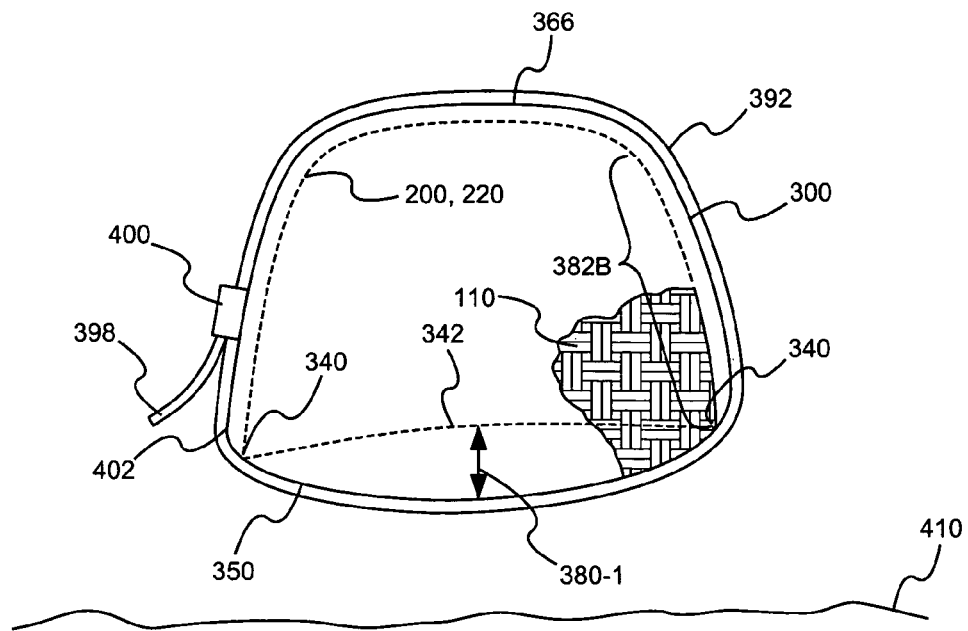
FIG. 3H is a secured bag configuration supporting the bulk material when the bucket is oriented in the BMT orientation.

The configuration of the straps 392 and the pattern and the bottom 350 and the soft sides 352, 354 renders the bag capable of supporting the bulk material 110 having the maximum weight value when the bucket 200, 220 is oriented in the BMT orientation shown in FIG. 3H, for example. There, the perimeter of the bottom 350 is shown urged by straps 392 into contact with the perimeter 340 of the mouth. In that orientation, the center of the soft-sided bottom 350 is shown under and spaced by distance 380-1 from the mouth 350 that is below the rigid body. That capability is to retain substantially all of the bulk material on the bottom 350 and within the rigid body of the bucket 200 that is within the soft-sides of the soft-sided bag 300. The value of distance 380-1 may depend on the L and W of the mouth 342 covered by the bottom 350, for example, and on the weight of the bulk material 110 in the bucket. Generally, distance 380-1 may be in the range of about two to about ten inches. Thus the opening 366 of the bag 300 is above the bottom 350 of the bag 300 so that substantially all of the bulk material 110 is within both the rigid body of the bucket 200, 220 of the equipment and within the soft-sided bag 300.

Figure 3I:
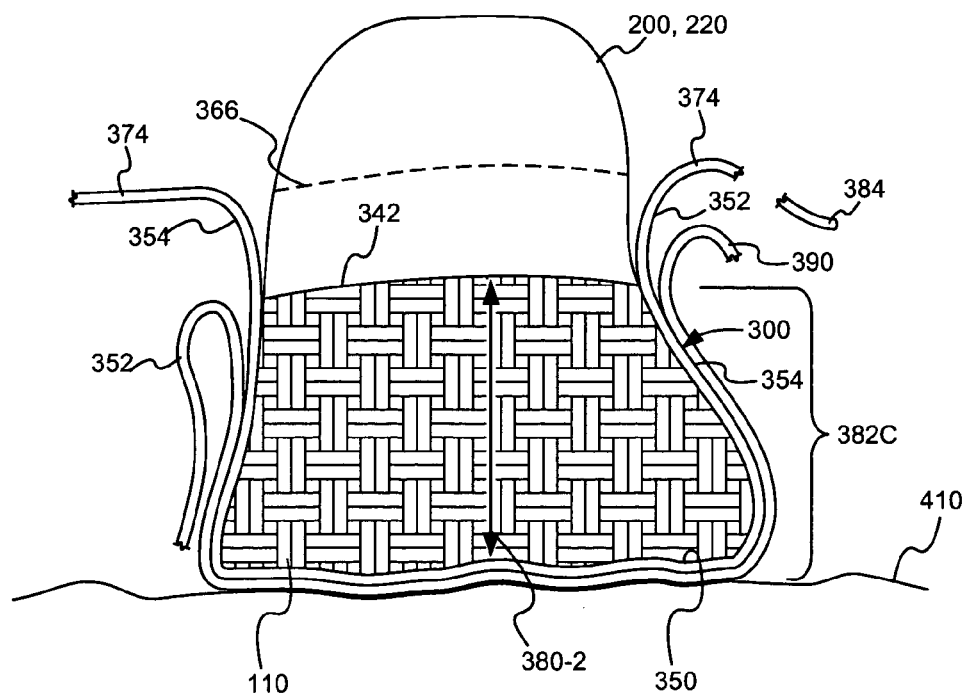
FIG. 3I shows the movement of the bucket by an arrow, relative to the bag that is resting on the support surface.

In further review, the first strap arrangement 390 is further configured (with the system 396 that is releasable) so that the straps 392 are releasable from the secured relationship (e.g., of the strap ends 398 and 404) to allow relative movement of the bag 300 in the BMT orientation (FIG. 3H) and the bucket 200, 220. This is movement still in the telescoped relationship. Movement of the bucket 200, 220 is shown in FIG. 3I by an arrow, and is relative to the bag that is resting on the support surface 410. Because the soft-sided bag 300 is configured to correspond to the bucket 200, 220, the upwardly moving bucket moves up close to the inside surfaces of the sides 352, 354 of the bag 300. In this manner, the mouth 342 moves away from the soft-sided bottom 350 and becomes positioned from the bottom 350 by a second distance 380-2 (FIG. 3I) greater than the first distance 380-1 (FIG. 3G) so that the soft-sides 352, 354 directly receive the bulk material 110 from the upwardly-moving rigid body of the bucket 200, 220200, 220. That bulk material 110 is transferred through the mouth 342 to effect transfer of the bulk material 110 into the soft-sided bag 300 while the mouth 342 is enclosed by the soft sides.

In another embodiment, the first strap arrangement 390 is configured so that the strap end portions are releasable from the secured relationship to allow the bag 300 and the bucket 200, 220200, 220 that are in the BMC orientation to move in the telescoped relationship relative to each other. This movement allows the soft-sided bottom 350 and the mouth 342 to be positioned away from the mouth 350 by the second distance 380-2 that is greater than the first distance so that the soft-sides 352, 354 directly receive the bulk material 110 from the rigid body of the bucket 200, 220200, 220 through the mouth 350 to effect transfer of the bulk material 110 into the soft-sided bag 300 while the mouth 350 is enclosed by the soft sides.

FIG. 3I also shows that the soft sides 352, 354 extend from all around the bottom perimeter of the bottom 350 and away from the bottom perimeter. Such sides are configured in the plurality of sections that correspond to the dimensions D and Y (FIG. 3A). The first of the sections 382C extends along the extent 382B (FIG. 3H) corresponding to (e.g., the depth D) of the hollow rigid body of the bucket 200, 220200, 220 of the equipment with which the bag is to be used. Section 382C is dimensioned to extend over the hollow rigid body. The second section 384 of the soft sides is configured to extend from the first section 382C past the hollow rigid body and terminates at the opening 366 of the bag 300.

Such closure of the mouth 350 may, for example, be assured by tightening the end 398 of strap 392-1 to the buckle 400 at the opposite end 402 of the strap 392-1 (or by use of the slip knot 400-2 as described above). Such tightening (or use) assures a secure relationship of the ends 398 and 402, for example, and effects such urging of the soft-sided bottom 350 against the mouth 342 to maintain the mouth 342 closed. Also, due to such tightening, the BMT orientation is facilitated. In detail, the BMT orientation of the container 300 and the bucket 200, 220 (and the bulk material 110) is shown in FIGS. 3H, I & 5E, e.g. The BMT orientation is there shown in which the soft-sided bottom 350 is directly under the mouth 342 and the opening 366 of the bag 300 is above the bottom 350 of the bag.

Figure 5B:
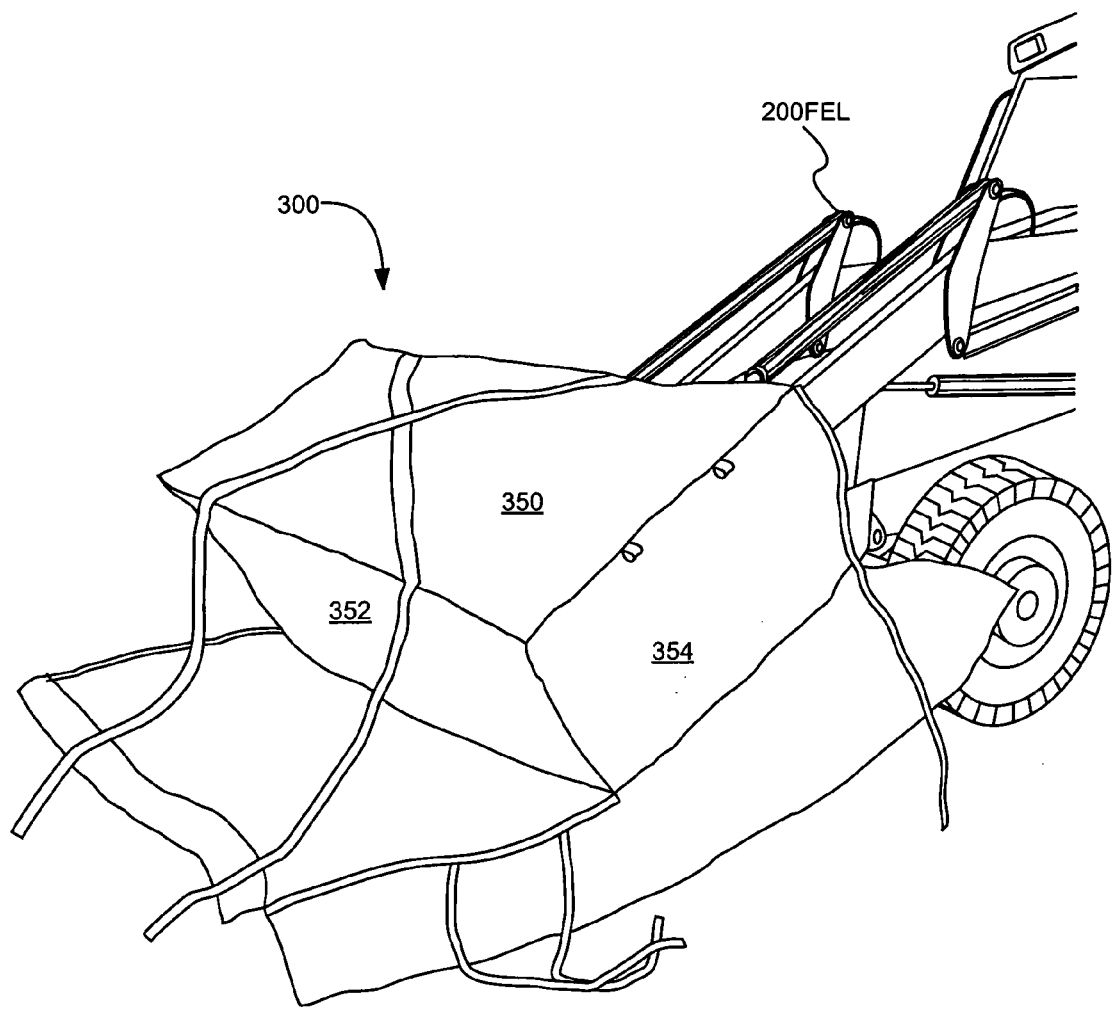
Figure 5C:
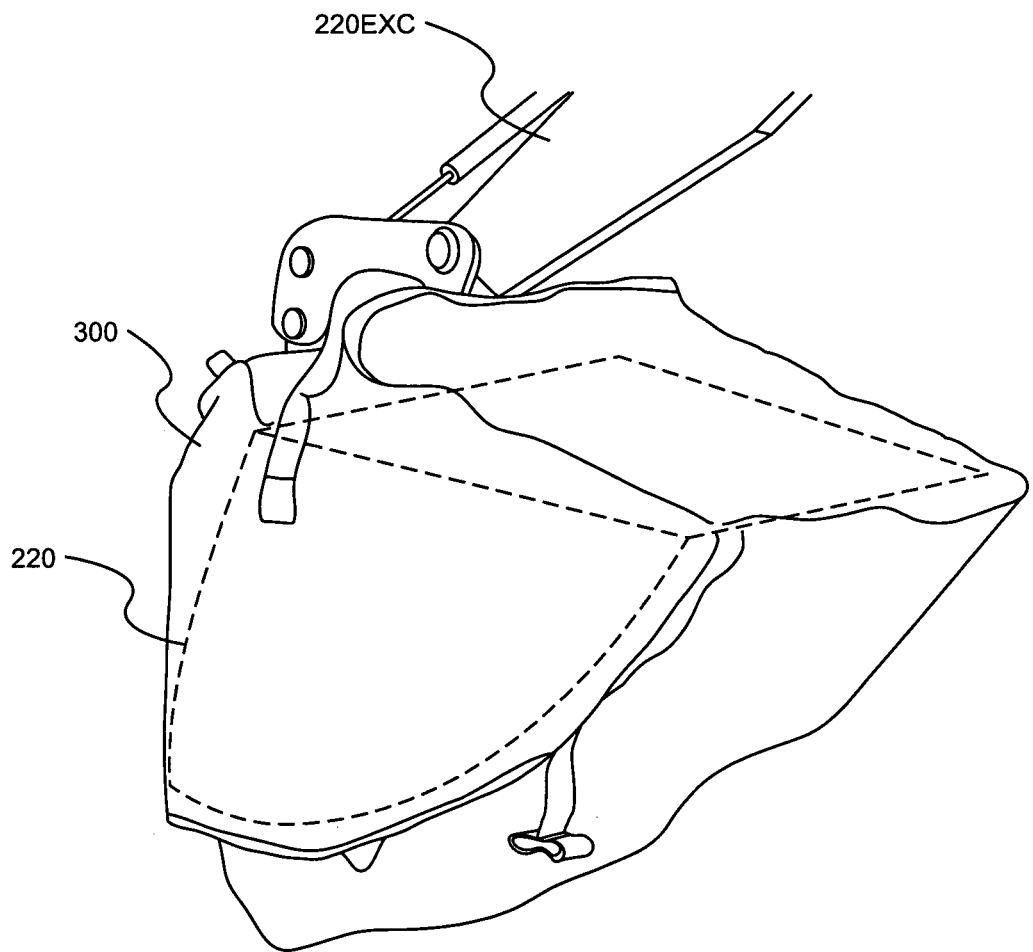

Also, in this BMT orientation substantially all of the bulk material 110 is within both the rigid body of the bucket 200 and within the soft-sided bag 300 because the bucket 200 is within the bag 300. Due to the described tightening of the self-tie (e.g., buckle 400 or slip knot 400-2), such urging of the soft-sided bottom 350 against the mouth 342 continues to maintain the mouth 342 closed in that the bottom 350 is configured strong enough to resist the weight of the bulk material 110 that acts down on the bottom 350. The mouth 342 is said to remain "closed" even though the bottom 350 may stretch and assume a somewhat curved shape as the bottom 350 resists the weight of the bulk material 110 (the shape being indicated by distance 380-1, FIG. 3H). As shown in FIG. 5E, in the BMT orientation the bucket 200 may be positioned with the bucket 200, 220200, 220 and the bottom 350 of the bag 300 above a support surface 410, such as the ground. Thus, as shown, the front end loader 200FEL may carry, or transport, the combined bucket 200, bag 300, and bulk material 110 while they are still in the BMT orientation, where the transport may be to any of the locations or for any of the purposes described above. The transport may be further understood by reference to FIGS. 5H &5I, showing that the straps 392 are further configured with an extended length. That length is greater than required for the securing shown in FIG. 3F & H, and is sufficient to allow the straps 392 to extend across the bottom 350 and across the opposite soft sides 352, 254 of the soft-sided container 300 that is in the BMT orientation. The length of the straps 392 is further configured to extend across an access space 389 that separates the bucket 200, 220 from the container 300 and to extend around the bucket to the respective closure structure (e.g., 400-2, FIG. 5H). In this manner, with the bag 300 on the surface 410, upon release of the closure structure (e.g., pulling on end 402 to untie slip knot 400-2) the location of the slip knot 400-2 along the end 402 may be changed to provide a greater length of strap 392 between the loop 400L and the slip knot 400-2. This change is enough to provide the access space 389. As a result, the configuration of the straps 392 may be described as being extendable to provide the access space 389. In this manner, the re-closed closure structure (e.g., re-tying the slip knot 400-2 at the new location) secures the soft-sided container 300 (with the substantially all of the unit of the bulk material 110 that is within the soft-sided container 300) to hang from the bucket 200, 220200, 220 for transport (e.g., per FIG. 5I). As so hung, the bucket 200, 220200, 220 supports the first strap arrangement 390, and that arrangement and the soft-sided bottom 350 and the soft sides 352, 354 are collectively further configured to enclose and carry the unit of bulk material 110, and the unit may be of a weight no less than the maximum weight that the bucket 200, 220200, 220 of the equipment (e.g., 200FEL to which the container configuration corresponds) is rated to receive and be filled by, and carry, and transfer into the container 300. Similarly, the unit may be of a volume no less than the maximum volume that the bucket 200, 220200, 220 of the equipment (e.g., 200FEL to which the container configuration corresponds) is rated to receive and be filled by, and carry, and transfer into the container 300. Thus, the container 300 is configured with a capacity to contain the entire unit of the bulk material 110 that was initially scooped up by the loader 200FEL or by the excavator 200EXC. It may be understood then, that the exemplary equipment 200FEL or 200EXC with which the bag 300 is to be used is configured to have a maximum weight-carrying capacity defined by a maximum weight value of the bulk material 110 that the standard bucket 200, 220200, 220 is permitted to receive.

The soft-sided container 300 can be formed from numerous materials and with numerous configurations of the strap arrangement 390. Construction materials and strap configurations are in some instances similar to those as described in Applicant's prior issued patent U.S. Pat. No. 6,079,934, entitled "Lift-liner Apparatus", issued on Jun. 27, 2000 and which is incorporated by reference in its entirety for all purposes.

It may be understood that the arrangement of straps 390 may be configured to extend at least partially along and secured to the soft sides 352, 354 and may be of length sufficient to extend completely around the rigid body of the bucket 200, 220200, 220. Also, by the system 396 in the form of the exemplary buckle 400 or slip knot 400-2, the arrangement 390 may be further configured to urge the soft-sided bottom 350 against the perimeter 340 of the mouth 342. Such urging closes the mouth 342 as described and retains substantially all of the bulk material 110 in the rigid body upon orientation of the bag 300 and the bucket 200, 220200, 220 in the BMT orientation (FIG. 5F). The BMT orientation is shown in FIG. 3I with the soft-sided bottom 350 under the mouth 342 and the opening 366 of the bag 300 above the bottom 350 of the bag 300. Substantially all of the bulk material 110 is within both the rigid body of the bucket 200, 220200, 220 that is within the soft-sided bag 300.

It may also be understood that by the self-tie configuration (e.g., buckle 400 or knot 400-2) the arrangement of straps 390 may be configured to be releasable (e.g., by untying each strap 392) to allow the oriented bag (in the BMT orientation, FIG. 5F) to move in the telescoped relationship shown in FIG. 3I relative to the oriented bucket (also in the BMT orientation). FIG. 3I shows that this release is done after the bag 300 is set on the ground 410, and the release allows the soft-sided bottom 350 and the mouth 342 to move away from each other. Such movement away is generally as shown in FIG. 3I in which the bucket 200, 220200, 220 is raised while the bag 300 is on the ground 410. The soft-sides 352, 354 are shown directly receiving the bulk material 110 from the rigid body, which effects transfer of the bulk material 110 through the mouth 342 directly into a section 382C (FIG. 3E) the soft-sided bag 300 while the mouth 342 is enclosed by the soft sides, e.g., 352, 354.

The releasable aspect of the arrangement 390 of straps 392 may also be described as being configured to release the configuration that urges the soft-sided bottom 350 against the perimeter of the mouth 342. As released, the inverted bucket 200, 220 (FIGS. 3H and 3I) is allowed to move out of the bag 300 and to no longer retain the bulk material 110 in the rigid body. In this example, the configuration for the release may be the system 396. In one embodiment, this configuration for the release may include the strap 392 with opposite strap end portions 398 and 402, one end portion being configured with the loop 400L and the other end portion being bendable to define the slip knot 400-2 as described above. With the loop, as described the slip knot 400-2 is releasable to separate the ends 398 and 402 of the strap and to permit the movement of the inverted bucket out of the bag and is re-formable to permit a re-tightening of the strap 392 upon the movement of the inverted bucket out of the bag, The re-tightened strap 392 is configured to extend from the bag around the bucket to carry the bag and the bulk material that is no longer retained in the rigid body. In the embodiment, system 396 may be in the form of the buckle 400 or the slip knot 400-2. For each strap 392, exemplary knot 400-2 is effective to loosen the strap (since the strap still extends over the bucket 200, 220) after the bag 300 is set on the surface 410. The loosening is untying the ends 398 and 402 of the strap, to permit the movement of the inverted bucket 200 out of the bag 300 as shown in FIG. 3I so that the bucket 200 no longer retains the bulk material in the rigid body. As described above, the slip knot 400-2 may be re-formed at the new location on end 402 (i.e., adjusted relative to strap end 398) to increase the value of the access space 389 thus permit re-tightening (tying) of the straps 392 before upward movement of the inverted bucket 200, 220 to the position shown in FIG. 5I. Thus the re-tightened straps 392 are configured to lift the bag 300.

In view of the above description of the first section 382C that receives the bulk material 110 that is no longer retained in the up-moving rigid body (FIG. 3I), it may be understood that the second section 384 of the soft sides 352, 354 extends from the first section 382C and is further configured by dimension Y to extend over the bulk material 110 received in the first section 382C and to be gathered or folded to close the opening 366 of the bag. Second section 384 may be configured from closure flap 374 (FIG. 3A), and may be closed, for example by being gathered and tied in a typical gooseneck manner or by a closure described in U.S. Pat. No. 6,079,934.

In review of one embodiment, the soft bottom 350 and soft-sides 352, 354 may be configured from woven polypropylene having a characteristic of porosity with respect to liquids and containment of particles. The bulk material 110 loaded in the bag 300 may be composed of particles of sand mixed with liquid water. The bag 300 may be referred to as a first bag 300-1 (not shown) that is further configured with a burst strength sufficient to retain the particles of sand 110 even under the force of other similar loaded and closed bags (e.g., 300-2, 300-3, etc, not shown) that are placed on top of the first loaded and closed bag 300-1. Under such force, for example, the woven polypropylene of the first bag 300-1 allows the liquid water to pass out of the first closed bag 300-1 while the woven polypropylene retains the sand 110 in the first closed bag 300-1. Exemplary burst strength for such retaining may be provided by configuring the blank 349 from woven polypropylene having a weight of about 6.5 to about 8 ounces per square yard, which is rated by a Mullen burst test at about from 650 to about 800 pounds per square inch of surface of the sides and bottom of the bag.

The strap arrangement 390 may be a first arrangement 390 as described above. The strap arrangement 390 may also be configured with a second strap arrangement 390-2. In conjunction with the flaps 374, the arrangement 390-2 may be configured with a closure structure 400-3 (FIG. 5G) similar to those described in such U.S. Pat. No. 6,079,934 to close the flaps 374 across the bag opening 366. The flaps 374 and closures 400-1 are used after the exemplary full container 300 is set onto the surface 410 such as after transport, or after the bag and bucket have been re-oriented into the BMT orientation (FIGS. 5E & 5F) from the BMC orientation (e.g., FIG. 5D) and then set on the surface 410 It may be appreciated that some of the plurality of straps 392 may be configured with the second strap arrangement 390-2, wherein the second strap arrangement is also configured with the closure 400-3 (FIG. 5I) to close the soft-sided container opening 366 and retain the bulk material 110 within the soft sides 352, 354 and on the soft-sided container bottom 350.

As described above, the blank 349 may be configured with the closure flap 374. This flap 374 may be used after the container 300 is set onto the surface 410 such as after transport or after being re-oriented into the BMT orientation from the BMC orientation. Closure structures similar to those described in such U.S. Pat. No. 6,079,934 may be used to close the opening 366.

Figure 4A:
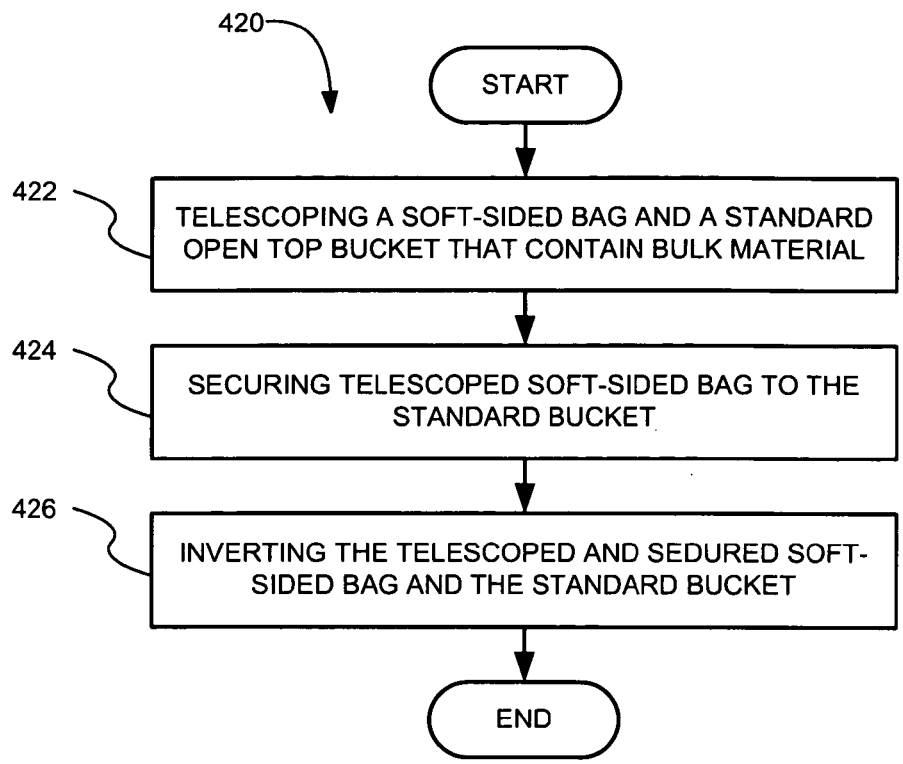
FIGS. 4A-4E are flowchart diagrams that illustrates the method operations performed in packaging bulk material with a soft-sided container.

FIG. 4A is a flow chart 420 illustrating method operations for transferring bulk material for transport. The operations illustrated herein are by way of example, as it should be understood that some operations may have sub-operations and in other instances, certain operations described herein may not be included in the illustrated operations. With this in mind, the method and operations of flow chart 420 shown in FIG. 4A will now be described. In an operation 422, a hollow empty soft-sided bag is telescoped over a standard open-top bucket attached to a bulk material handling equipment as shown in FIGS. 5B and 5C. The bag may be bag 300 and the bucket may be exemplary bucket 200 attached to an exemplary piece of bulk material handling equipment (e.g., 200FEL or 200EXC). The bucket of each bucket 200, 220 is configured with the mouth 342 extending around the open-top and with walls 346 extending from the mouth 342 to the base 348 of the bucket. The telescoping orients the bucket with the mouth 342 facing up to contain the bulk material 110. The telescoping further orients the bottom 350 of the bag 300 across the open-top of the bucket with sides 352, 354 hanging from the mouth 342 and outside of the walls 346 of the bucket 200. The hanging sides 352, 354 extend toward the base 348 and in FIG. 3E are shown extending at least partially along the walls 346 to at least partially enclose the walls 346. The sides 352, 354 may also hang (or extend down) past the walls of the bucket. The base 348 is below the bottom 350. FIG. 3E depicts the telescoping.

Figure 5D:
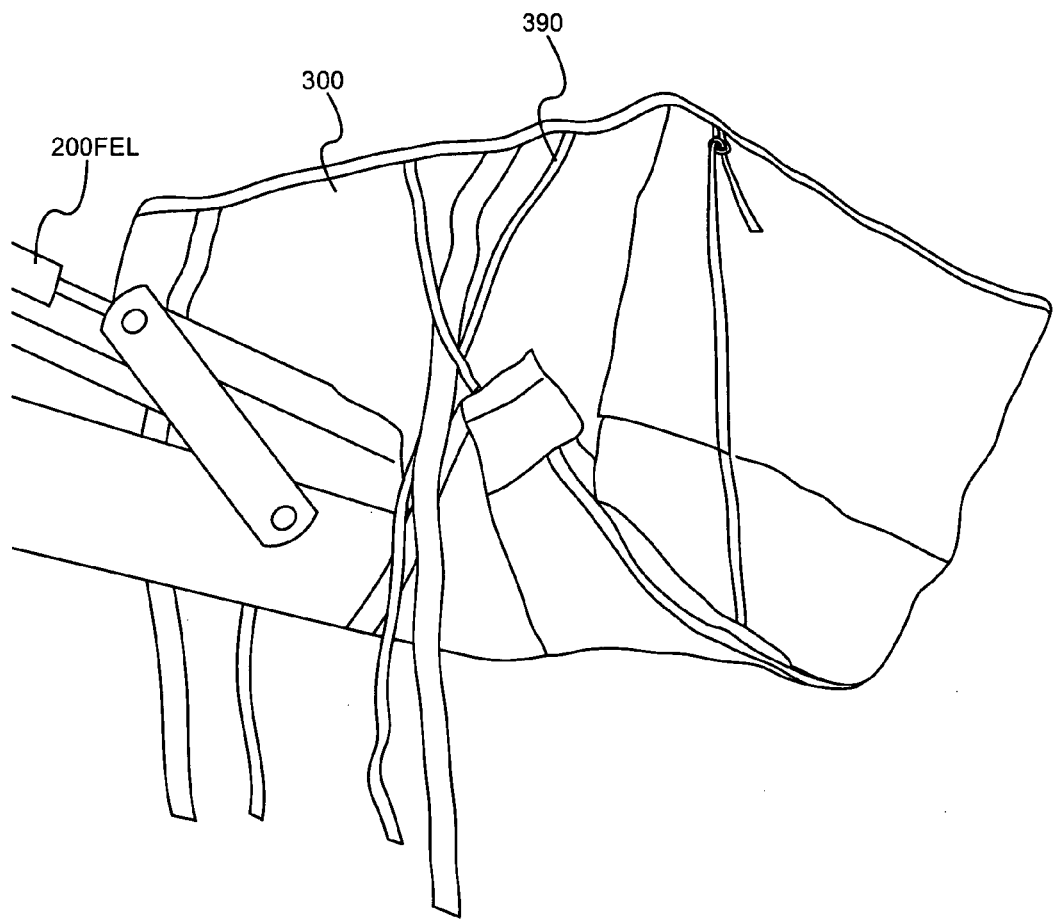
Figure 5E:
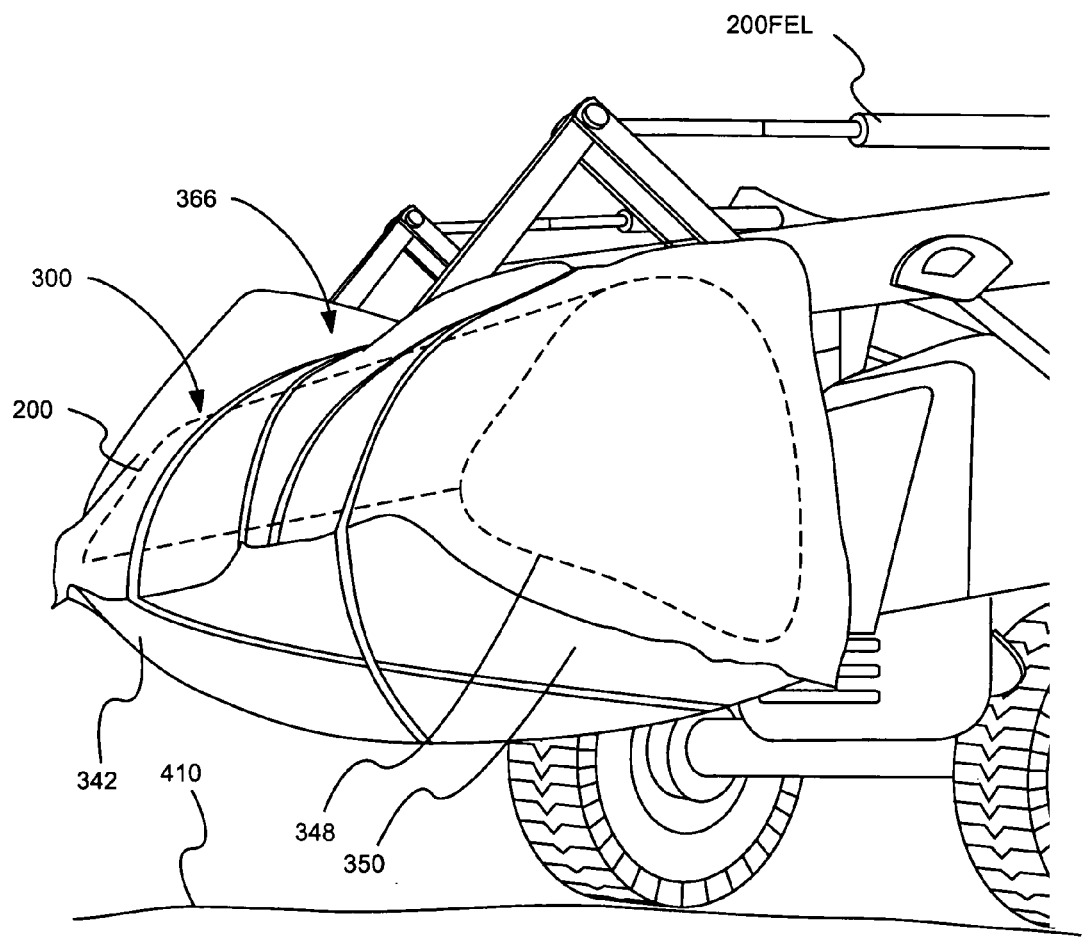
Figure 5F:
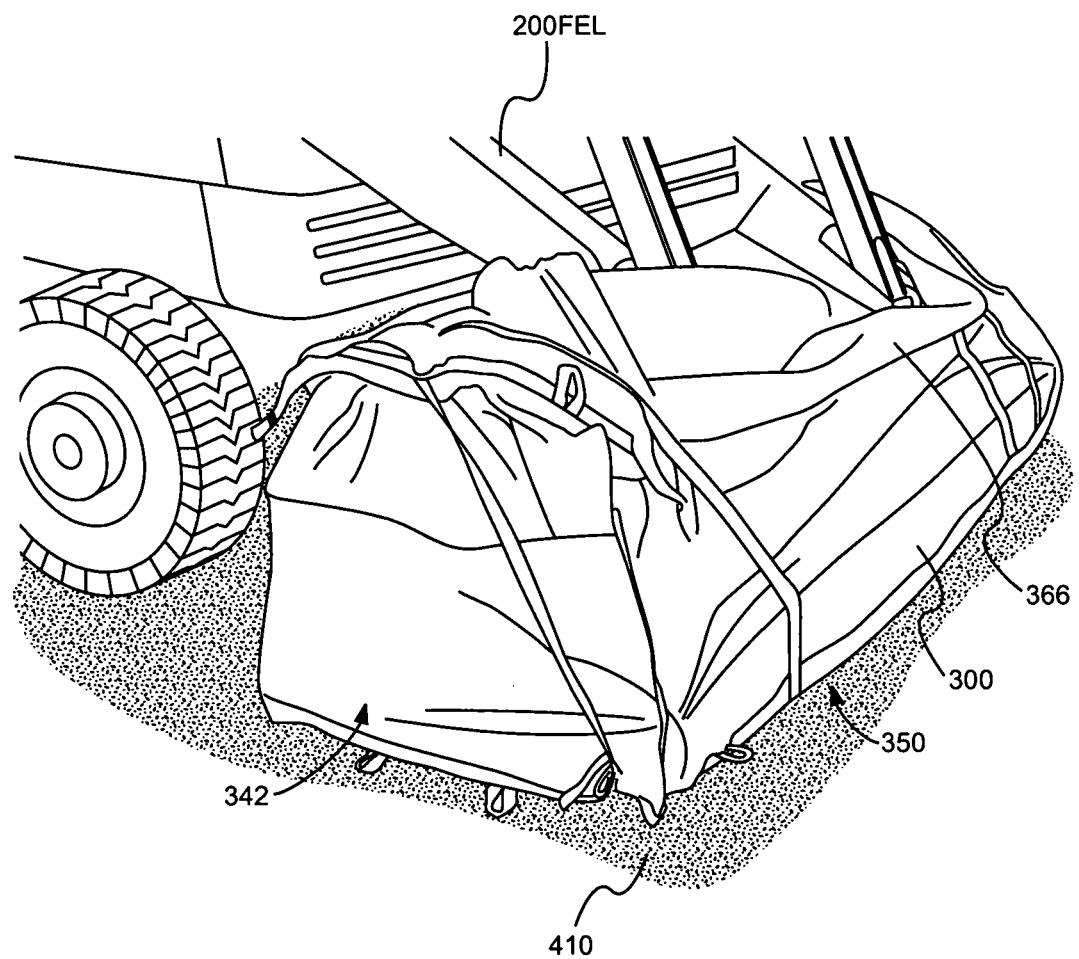
Figure 5G:
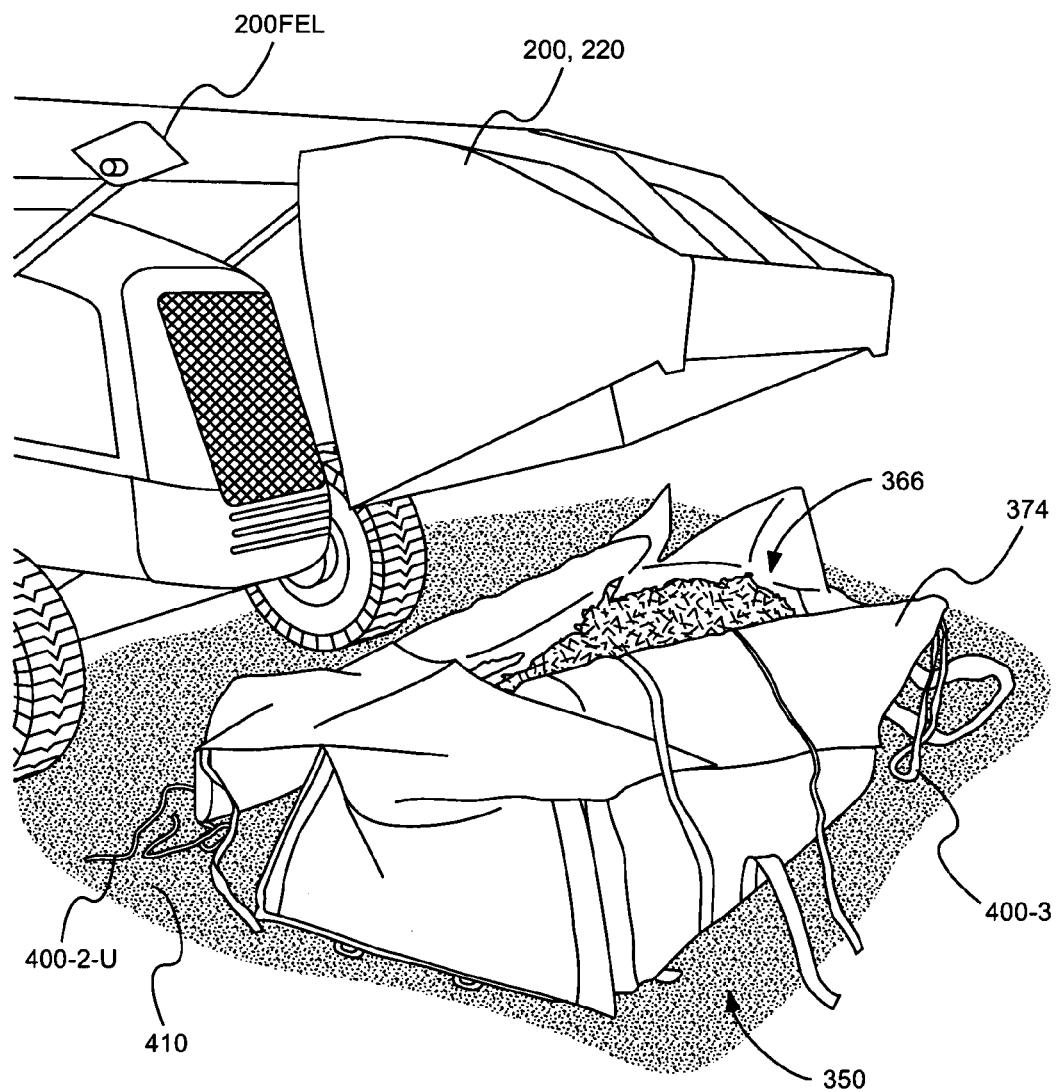
Figure 5H:
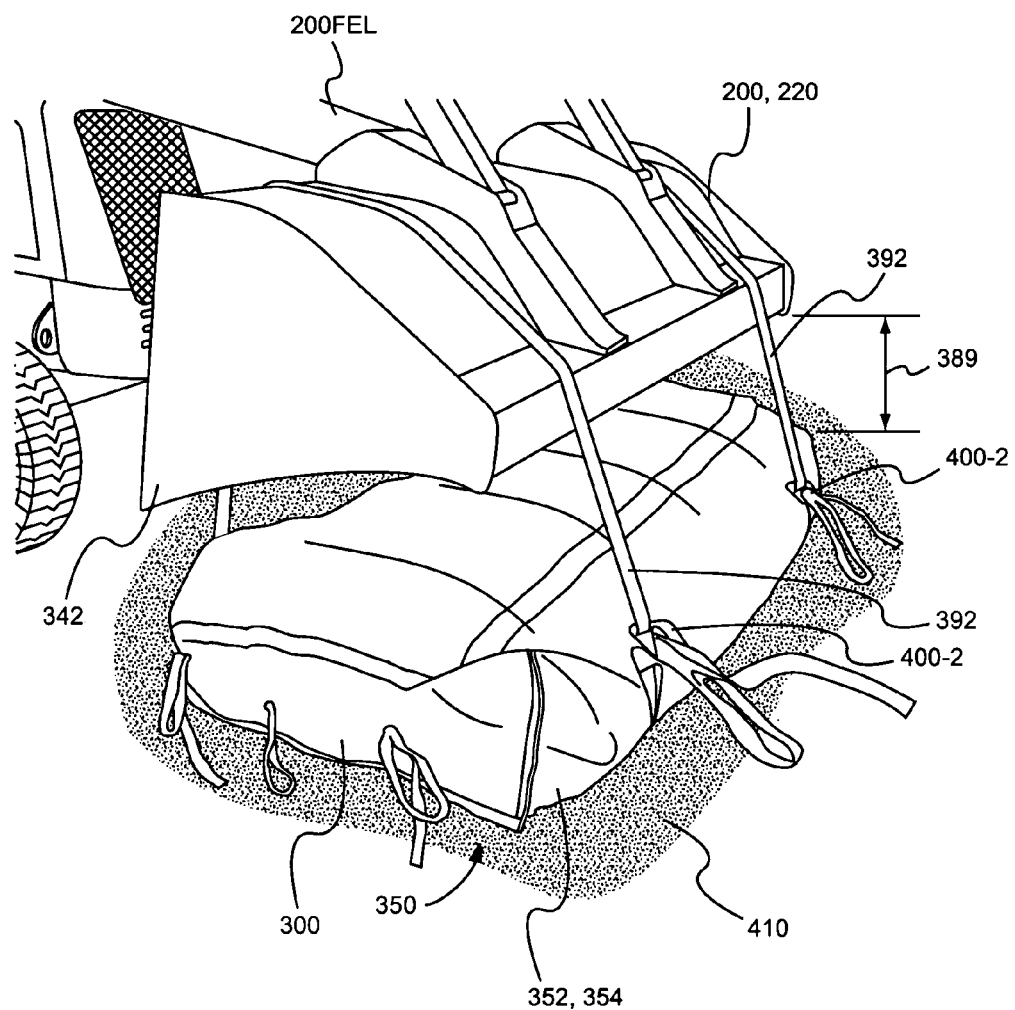
Figure 5I:
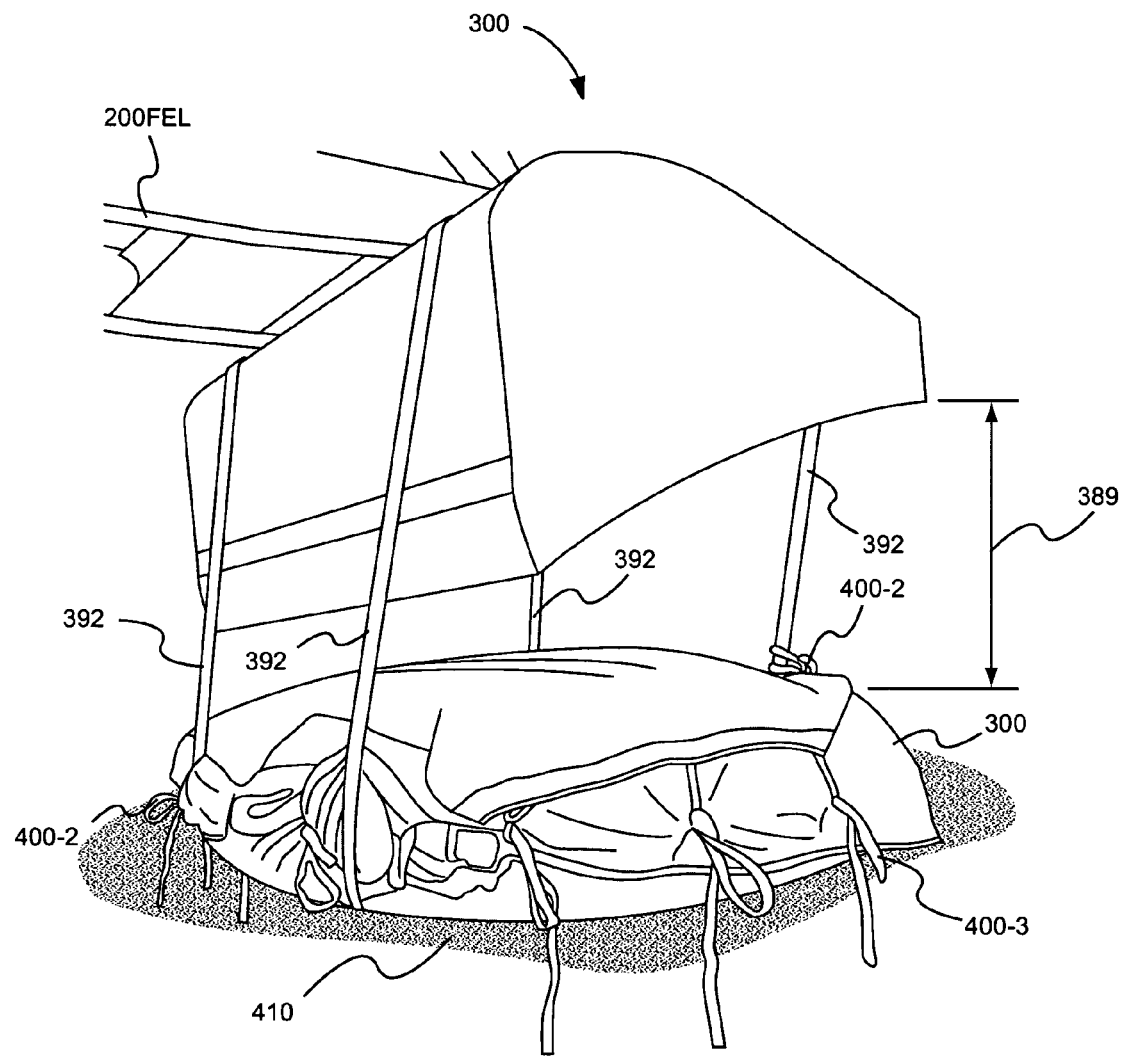

The method moves to an operation 424 of securing, in which the telescoped empty bag is secured to the standard bucket that contains the bulk material so that the bottom of the bag is held against the mouth to close the open-top of the standard bucket as shown in FIGS. 3F and 5D. In one embodiment, the strap arrangement 390 is used to perform operation 424, and the sides 352, 354 are thereby maintained close to the walls 346. The method moves to an operation 426 of inverting, in which the telescoped and secured empty bag and the standard bucket are inverted so as to orient the bucket with the mouth facing down and the bottom of the bag under the mouth for transferring the bulk material onto the bottom of the bag for support against the force of gravity so that the walls of the bucket laterally retain the bulk material that is supported on the bottom of the bag, as shown in FIGS. 3H & 5E. In the end view of FIG. 3H, the ends of the side 352 and the end 344E of the wall 346 are shown cut away to expose one wall of the bucket 200 laterally retaining the bulk material 100 that is supported on the bottom 350 of the bag 300. The transfer of the bulk material 110 is illustrated by the bottom 350 supporting the bulk material 110. The inverting is shown in FIG. 3H to position the bucket 200 inside the bag 300 with the sides 352, 354 extending upwardly and enclosing the mouth 342 of the bucket 200. The inverted bag 300 is thus around the inverted bucket 200.

Figure 4B:
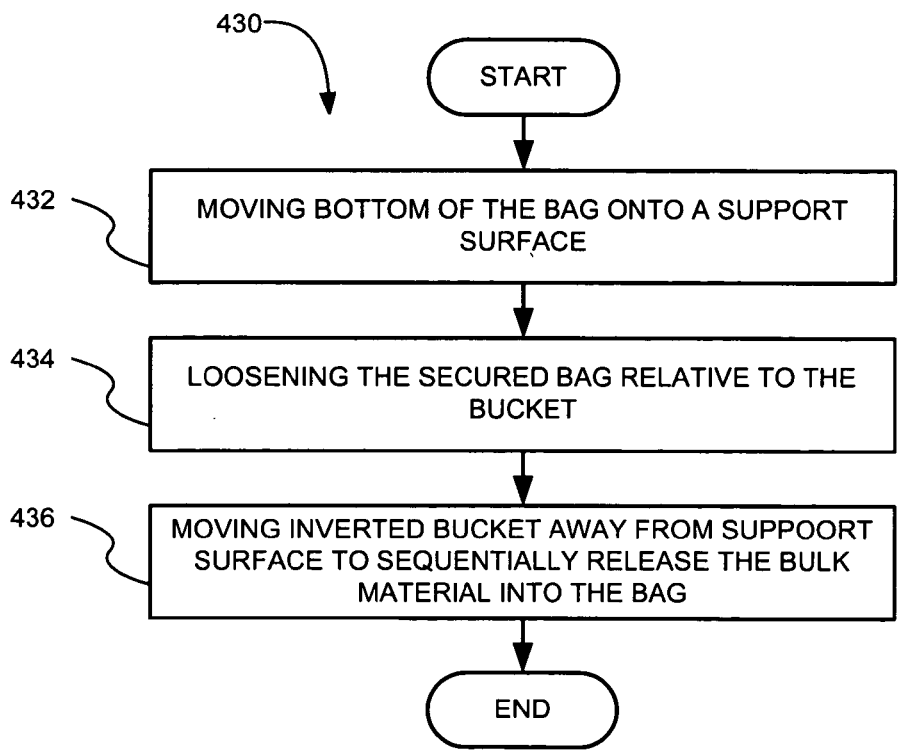
Figure 4C:
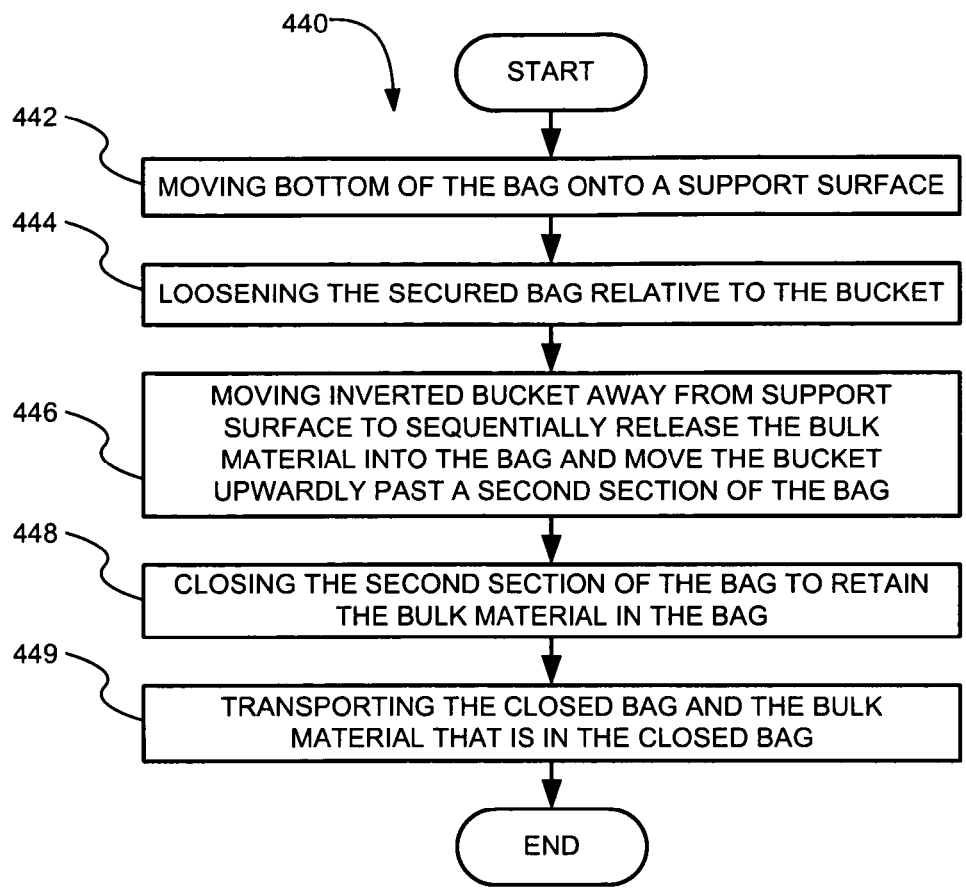

Referring now to FIG. 4B, a flow chart 430 describes additional operations for transferring bulk material for transport. In a setting operation 432, the bottom 350 of the secured bag 300 is set onto a support surface, as shown in FIG. 5F by surface 410 supporting the secured bag 300. The method moves to a loosening operation 434 in which the secured and set bag is loosened relative to the standard bucket 200. The loosening operation 434 may be performed, e.g., by unbuckling buckles 400, or untying slip knots 400-2, and moving the flaps 374 away from the bucket 200, with the sides 352, 354 tending to lean against the walls 346 of the bucket, the walls 346 being inside the bag 300. The method moves to a slowly moving operation 436 in which the inverted telescoped bucket is slowly moved away from the support surface so that the walls of the inverted bucket sequentially release all of the bulk material from the bucket into the bag. FIG. 3I shows an exemplary stage of operation 436, near the completion of the slow moving. The slow moving starts with the bucket in the bag 300 near the bottom 350. The rate of slow moving is selected according to the depth D of the bag and bucket. Exemplary rates may be about two to about 3 inches per second for a D=24 inches. Exemplary rates may be about ten seconds to move the bucket through a D=24 inches and about twenty seconds to move the bucket through a D=4 feet. The slow rate may be interrupted and the equipment (e.g., 200FEL) may be moved toward or away from the bag on the surface 410 to keep the bucket 200 centered between the walls 346. The slow moving is then resumed. The slow moving assures that the upwardly-moving mouth 342 of the bucket releases only a small portion of the bulk material 110 into the bag and against the sides 352, 354 at any moment. The release is from the lateral force applied by the walls 346 on the bulk material 110. As the bucket moves slowly upward, these small portions are sequentially released from the bucket and then contained by the sides 352, 354 of the bag 300. FIG. 3I shows the sides 352, 354 bulging outwardly as they contain the material 110, and the bucket moved out of the bag to about the depth D, at which position all of the material 110 has been released by the bucket into the bag Referring now to FIG. 4C, a flow chart 440 describes additional operations for transferring bulk material for transport. In a setting operation 442, the bottom 350 of the secured bag 300 is set onto a support surface, as shown in FIG. 5F by surface 410 supporting the secured bag 300. The method moves to a loosening operation 444 in which the secured and set bag is loosened relative to the standard bucket 200. The method moves to a slowly moving operation 446 in which the inverted telescoped bucket is slowly moved away from the support surface so that the walls of the inverted bucket sequentially release all of the bulk material from the bucket into the bag. In operation 446 the moving of the bucket also moves the bucket upwardly past a second side of the bag. FIG. 3F shows the second side as the flap 374, and the amount past the flap 374 is enough to allow use of the closure 400-3.

The method moves to a closing operation 448 in which the second section of the bag is closed to retain the bulk material in the bag. FIG. 5H shows closure 400-2 secured to tightly close the bag 300. The method moves to a transporting operation 449 in which the closed bag is transported with the enclosed bulk material in the bag as shown in FIG. 5I. The straps 392 are shown being lifted by the raised bucket 200 to lift the closed bag off the support 410, and the equipment 200FEL then carries the bag to a destination location. Thus the method operation 449 transports the closed bag and the bulk material that is in the closed bag by operating the exemplary bulk material handling equipment 200FEL that performed the operations 442 and 446, after that same equipment performed the operation 426 of FIG. 4A. Therefore, the transporting of the secured bag 300 and the bulk material 110 in the bucket 300 to a location is by operating the same piece of bulk material handling equipment as performed these noted operations 426, 442, and 446.

Figure 4D:
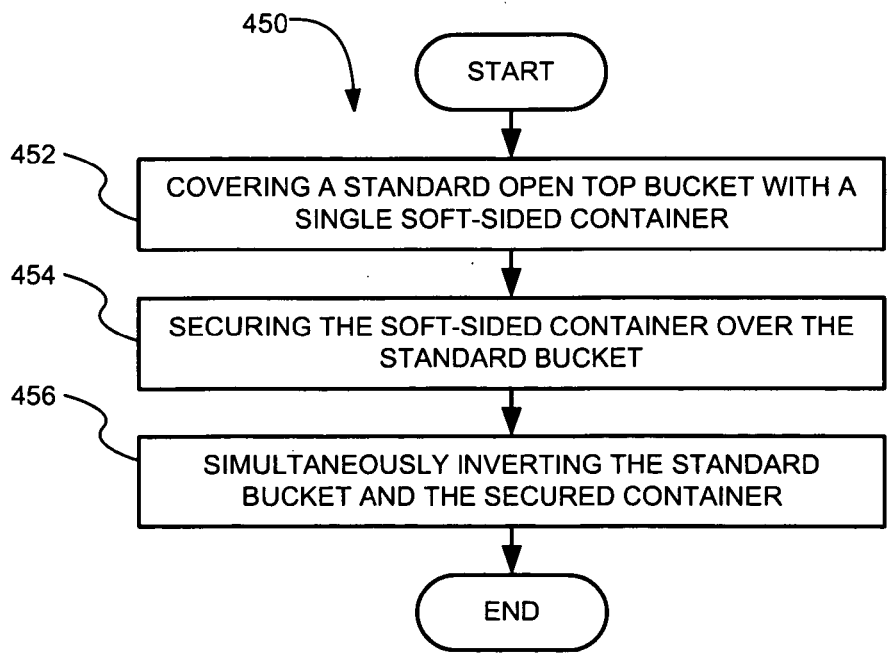

Referring now to FIG. 4D, a flow chart 450 illustrates operations of an embodiment of a method packaging bulk material, The method moves to a covering operation 452 in which a standard open-top bucket is covered with a single soft-sided container. The bucket is attached to a piece of bulk material handling equipment and is configured with a mouth at the open-top to receive and discharge bulk material to be packaged. The covering is by a bottom of the single soft-sided container and by sides of the container, the bottom being configured to span the mouth and the sides being configured to define an opening. FIG. 5B shows initiation of operation 452 in which the container 300 is over the bucket that is in the BMC orientation shown in FIG. 5A, with the bottom 350 shown, and the sides 352, 354 of the container 300 hanging from the bottom. FIGS. 3C & 3D illustrate operation 452, and may be as described above with respect to these FIGS., with the covering being completed as shown in FIG. 3D. FIG. 3E also shows completion of the covering operation 452 in that the bottom 350 spans the opening 342 of the bucket 200. Spanning results, e.g., from the configuration of the bottom 350 with the dimensions L+X and W+X as described above, such that the bottom 350 extends across the entire perimeter 340 of the mouth 342. The method moves to a securing operation 454 in which the single soft-sided container is secured over the standard bucket. In operation 454 the bottom of the bag is held against the mouth to close the open-top of the standard bucket. FIG. 3F shows one embodiment of operation 454 as performed by the strap arrangement 390, including the latching the buckle 400 tightening the straps 392 to hold the bottom 350 against the mouth 342. The tight straps and the bottom 350 close the mouth 342 so that the bulk material 110 in the bucket 200 is retained in the bucket. The method moves to a simultaneous inverting operation 456, in which there is simultaneous inverting of the secured bucket and the bulk material therein and the secured container. The inverting operation 456 orients the bucket substantially downward and transfers the bulk material from the bucket onto the secured single soft-sided container while the single soft-sided container continues to cover the bucket. FIG. 3H illustrates the end of the inverting operation, showing via the cutaway the transfer of the bulk material 110 from the bucket 200 onto the bottom 350 of the secured single soft-sided container, and the bottom curved and retaining the material 110 against the force of gravity.

Figure 4E:
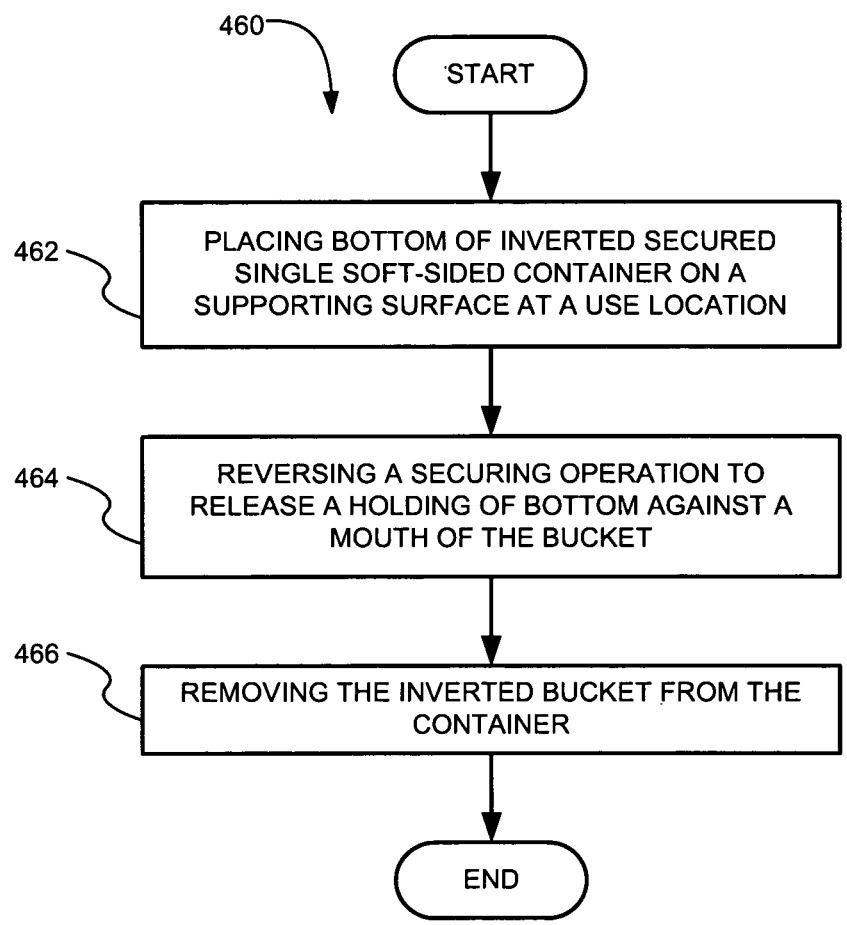

An additional embodiment of the method of packaging bulk material may be understood by reference to the flow chart 460 shown in FIG. 4E, in which the bulk material is in a preliminary package represented by the cover, secured, and inverted bucket and container shown exemplary in FIG. 5E. In FIG. 4E the method moves to a further operation 462 of placing the bottom of an inverted secured single soft-sided container on a supporting surface at a location at which the container is to be used. FIG. 5F shows operation 462, with the location being surface 410, and the equipment 200FEL having been used for the placing. Thus, this placing was done by using the same piece of equipment as performed the prior simultaneously inverting operation 456, reducing the number of different pieces of equipment required to package the bulk material that is in the container 300. The method moves to a further operation 464 of reversing a securing operation to release a holding of a bottom of the inverted container against a mouth of the bucket. Operation 464 may be understood by reference to FIG. 5G, in which the previously secured system 396 (e.g., the slip knot 400-2) is shown untied and identified by 400-2-U, indicating that the tied knot 400-2 has been reversed by the untying, and no longer holds the bottom 350 of the inverted container 300 against the mouth 342 of the bucket 200. As a result, the opening 366 of the container 300 has been done by moving the flaps 374 away from over the material 110, to allow the next operation 466 which is removing the inverted bucket from the inverted soft-sided container. The removing is the above-described slow movement of the bucket upwardly. The bucket 200 is moved to and through the open end (opening 366) of the soft-sided container 300 to sequentially release all of the bulk material 110 from the bucket into the single soft-sided container. The closing of the container 300 may then be done by using the closure 400-3.

In another method embodiment, the above covering operation 452 may include an operation of configuring the container from woven polypropylene having a characteristic of porosity with respect to liquids and containment of particles. Such configuring provides a container specially useful to contain bulk material that is particles of sand mixed with liquid water. In this embodiment, further operations may include closing the opening of the single soft-sided container to package the bulk material at the location at which the container was placed. In addition, there may be a use of the same piece of equipment to repeat the operations of FIGS. 4D and 4E, and then perform the last-described configuring and closing operations with respect to a series of next containers and more such bulk material. Also, some of the next containers of the series of next containers are placed on top of a prior-placed container, and the placing of the some on the respective tops urges the liquid water through the woven polypropylene of the closed prior-placed container while the polypropylene retains the sand in the prior-placed closed container.

In still another method embodiment, a sequence of operations is varied from those set forth above. For example, once a bucket and container have been inverted (e.g., by operation 456), there may be an operation of transporting the inverted bucket and the bulk material therein and the inverted secured container to a location for packaging the bulk material in the soft-sided container. Then, there may be placing the bottom of the inverted secured single soft-sided container on a supporting surface at a location at which the container is to be used, the placing being by using the same piece of equipment as did the transporting. Then, there may be reversing the securing operation to release the holding of the bottom of the inverted container against the mouth. This is followed by removing the inverted bucket from the inverted soft-sided container, the removing being slow movement to and through the open end of the soft-sided container to release all of the bulk material from the bucket into the single soft-sided container to package the bulk material at the location. The open end of the container may then be closed, and the container left at the location.

In yet another method embodiment, a sequence of operations is varied from those set forth above. Referring to FIG. 4D, situations may arise in which the bulk material must be quickly removed from the location at which the bucket scooped the material 110, yet the scooped material in the bucket 200 must be covered before being transported. In this embodiment, after the securing operation 454 (FIG. 4D) and before the simultaneously inverting operation 456, there is an operation of transporting the secured bucket and the bulk material therein and the secured container to a location for packaging the bulk material in the soft-sided container. Then there is performing the simultaneously inverting operation 456.

In one other embodiment, additional operations of flow chart 460 (FIG. 4E) may be as follows. The reversing of the securing operation in operation 464 may comprise loosening straps that are secured to the container bottom and to the soft-sides and that extend around the bucket to open the opening of the soft-sided container and permit the removing of the inverted bucket. Further operations may close the opening of the single soft-sided container to package the bulk material at the location at which the container was placed. Also, then there is an operation of extending the straps completely around the bucket. Then an operation of securing the straps to each other is performed. Raising the bucket is done to hang the inverted closed container and the bulk material in the inverted closed container from the bucket away from the supporting surface. Lastly, using the same piece of equipment, there is an operation of transporting the raised bucket and the hanging inverted closed container and the bulk material in the hanging inverted closed container. These operations will be understood from the above descriptions.

In a further other embodiment, both of the above securing operations comprise the operation of configuring the straps as a plurality of straps, each of the straps being configured with ends extending away from the container and with the ends configured to be secured to each other, the strap configuring further providing the secured straps with a bulk material-carrying capacity that is no less than a maximum weight-carrying capacity of the standard open-top bucket that is attached to the piece of bulk material handling equipment A volume of the bulk material in the closed single soft-sided container may be substantially equal to a volume of the bucket filled with the bulk material.

Further because the soft-sided container 300 holds the same weight and volume as the equipment bucket 200, a single bucketful of bulk material can be used to fill the soft-sided container 300. The reverse is also true in that the soft-sided container 300 can hold a single full equipment bucket 200 of bulk material. Further still the soft-sided container 300 does not require an external structure to hold the soft-sided container open while it is being filled.

If multiple layers of soft-sided containers are used then the equipment bucket is covered with a first soft-sided container such that the bottom of the first soft-sided container is aligned with and covers the open end of the equipment bucket. The first soft-sided container may be a liner without the straps 392. Then there is covering the first soft-sided container with a second soft-sided container such that the bottom of the soft-sided container is aligned with and covers the open end of the equipment bucket and using the straps 392 of the second container to secure at least the second soft-sided container over the bottom of the equipment bucket. It may be advantageous to use multiple of layers of soft-sided containers because each layer may have different physical properties. By way of example, one layer may be selected for the physical strength to support the desired weight or to resist puncture if the bulk material include sharp edges (e.g., metal scrap or glass shards) and another layer may be resistant to a liquid portion of the bulk material. Still another layer may have other physical properties such as being resistant to low-level radiation or capable of being punctured without tearing (e.g., ripstop properties) or capable of withstanding long term exposure to weather or water or wind or other elements.

One or more of the layers of the soft-sided container can be a reinforcing layer. The reinforcing layer can include a wire, a cable a wire net, a cable net, a metallic sheet, a plastic sheet, a plastic mesh, a composite material layer, a composite mesh or other suitable reinforcing materials or combinations thereof. The reinforcing layer can be an internal or external layer.

As used herein in connection with the description of the invention, the term "about" means ±10%. By way of example, the phrase "about 250" indicates a range of between 225 and 275. It will be further appreciated that all the processing represented by the operations may not be necessary to practice the invention.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A soft-sided bag system comprising:
    a container coupled to a powered loading equipment, wherein the container is a hollow rigid body having at least one rigid side wall, at least one rigid end wall and an opening; and
    the soft-sided bag including:
        a soft-sided bottom having a bottom area substantially corresponding to an area of the opening of the container, the container configured for use as scooping a plurality of bulk materials;
        a plurality of soft sides including:
            a corresponding plurality of first ends of each of the plurality of soft sides joined to a perimeter of the soft-sided bottom, the plurality of soft sides extending away from the soft-sided bottom, the plurality of soft sides extending along and beyond a corresponding depth of the container along a corresponding one of a plurality of exterior surfaces of the container, wherein adjacent edges of the plurality of soft sides are joined together; and
            a corresponding plurality of second ends of the soft sides forming an opening of the soft-sided bag, the opening of the soft-sided bag being opposite from the soft-sided bottom; and
        a plurality of straps at least partially extending along and secured to the plurality of soft sides, the plurality of straps having a length sufficient to extend around a perimeter of the container, wherein the plurality of soft sides of the soft-sided bag are configured to be supported by the corresponding plurality of exterior surfaces of the container in contact with a plurality of interior surfaces of the soft-sided bag.

2. The soft-sided bag of claim 1, wherein the container is a bucket on a front-end loader.

3. The soft-sided bag of claim 1, wherein the container is a bucket on a back-hoe.

4. The soft-sided bag of claim 1, wherein the container is part of a powered excavation machine.

5. The soft-sided bag of claim 1, wherein at least some of the plurality of straps includes an end portion configured to releasably couple the end portion to a second one of the plurality of straps.

6. The soft-sided bag of claim 1, wherein the soft-sided bag further comprises a second plurality of straps configured to close the opening of the soft-sided bag.

7. The soft-sided bag of claim 1, wherein each one of the plurality of straps extends in a path across and secured to the soft-sided bottom.

8. The soft-sided bag of claim 1, wherein soft-sided bag is configured to enclose and carry a weight of at least one of the plurality of bulk materials at least equal to a weight rating of the container.

9. The soft-sided bag of claim 1, wherein the soft-sided bottom and soft-sides are formed from a woven polypropylene having a selected characteristic of porosity sufficient to contain particles of the plurality of bulk materials having a selected particle size.

10. The soft-sided bag of claim 1, wherein the soft-sided bottom and soft-sides are formed from a material having a selected characteristic of porosity sufficient to contain a liquid portion of at least one of the plurality of bulk materials.

11. The soft-sided bag of claim 1, wherein the bottom area has a bottom length and a bottom width equal to or up to about four inches larger than a corresponding opening length and opening width of the opening of the container.

12. A soft-sided bag system comprising:
    a front end loader bucket, wherein the bucket includes a hollow rigid body having at least one rigid side wall, at least one rigid end wall and an opening; and
    the soft-sided bag including:
        a soft-sided bottom having a bottom area substantially corresponding to an area of the opening of the bucket, the bucket, configured for use as scooping a plurality of bulk materials;
        a plurality of soft sides including:
            a corresponding plurality of first ends of each of the plurality of soft sides joined to a perimeter of the soft-sided bottom, the plurality of soft sides extending away from the soft-sided bottom, the plurality of soft sides extending along and beyond a corresponding depth of the bucket along a corresponding one of a plurality of exterior surfaces of the bucket, wherein adjacent edges of the plurality of soft sides are joined together; and a corresponding plurality of second ends of the soft sides forming an opening of the soft-sided bag, the opening of the soft-sided bag being opposite from the soft-sided bottom; and a plurality of straps at least partially extending along and secured to the plurality of soft sides, the plurality of straps having a length sufficient to extend around a perimeter of the bucket, wherein soft-sided bag is configured to enclose and carry a weight of the bulk material at least equal to a weight rating of the bucket, wherein the soft-sided bottom covers the opening of the bucket and plurality of sides enclose the corresponding plurality of exterior surfaces of the bucket and the plurality of bulk materials contained within the bucket, wherein a volumetric capacity of the soft sided bag corresponds to a volume of the bucket and wherein the plurality of soft sides of the soft-sided bag are configured to be supported by the corresponding plurality of exterior surfaces of the bucket in contact with a plurality of interior surfaces of the soft-sided bag.

13. The soft-sided bag of claim 12, wherein each one of the plurality of straps extends in a path across and secured to the soft-sided bottom.

14. The soft-sided bag of claim 12, wherein the bottom area has a bottom length and a bottom width equal to or larger than a corresponding opening length and opening width of the opening of the container.

15. The soft-sided bag of claim 1, wherein the soft-sided bottom covers the opening of the container and plurality of sides enclose the container and the plurality of bulk materials contained within the container.

16. A soft-sided, bulk material bag system comprising:

a container coupled to a powered loading equipment, wherein the container is a hollow rigid body having at least one rigid side wall, at least one rigid end wall and an opening; and the soft-sided bag including:
a bottom having a bottom area substantially corresponding to an area of the opening of the container;
a plurality of sides, each one of the plurality of sides having a corresponding bottom edge, side edges and top edges, the corresponding bottom edges being bonded to a perimeter of the bottom, the plurality of sides extending away from the bottom, the plurality of sides extending at least a corresponding depth of the container along a corresponding one of a plurality of exterior surfaces of the container;

wherein adjacent side edges of the plurality of sides are bonded together; and wherein the top edges of the plurality of sides define a perimeter of an opening of the soft-sided bag, the opening of the soft-sided bag being opposite from the bottom, wherein a corresponding interior surfaces of the plurality of soft sides are supported by the corresponding plurality of exterior surfaces of the container in contact with a plurality of interior surfaces of the soft-sided bag.

17. The bag of claim 16, wherein the corresponding bottom edge of at least one of the plurality of sides is bonded to the perimeter of the bottom by a first fold line in a continuous sheet.

18. The bag of claim 16, wherein the corresponding bottom edge of at least one of the plurality of sides is bonded to the perimeter of the bottom by a first seam.

19. The bag of claim 16, further comprising at least one of a reinforcing seam or a reinforcing layer disposed where at least one of the bottom edge of at least one of the plurality of sides is bonded to the perimeter of the bottom.

20. The bag of claim 16, wherein at least two of the adjacent side edges of the plurality of sides are bonded together by a second fold line in a continuous sheet.

21. The bag of claim 16, further comprising at least one of a reinforcing seam or a reinforcing layer disposed where at least one of the adjacent side edges of the plurality of sides is bonded together.

22. The bag of claim 16, further comprising at least one strap, the at least one strap being disposed to secure the plurality of sides to the exterior of the container, the secured plurality of sides substantially covering the exterior of the container.

23. The soft-sided bag of claim 1, wherein at least one side wall of the container includes a cutting edge.

* * * * *